United States Patent [19]

Santoh et al.

[11] Patent Number: 5,516,469
[45] Date of Patent: May 14, 1996

[54] PROCESS FOR PRODUCING SUBSTRATE SHEET FOR INFORMATION RECORDING MEDIUMS

[75] Inventors: Tsuyoshi Santoh, Yokohama; Hiroyuki Sugata, Yamato; Masataka Yashima; Hirofumi Kamitakahara, both of Yokohama; Hitoshi Yoshino, Tokyo; Osamu Kanome, Kawasaki; Tetsuya Sato, Kawasaki; Hisanori Hayashi, Kawasaki, all of Japan

[73] Assignee: Canon Kabushiki Kaisha, Tokyo, Japan

[21] Appl. No.: 217,806

[22] Filed: Mar. 28, 1994

Related U.S. Application Data

[62] Division of Ser. No. 38,056, Mar. 30, 1993, Pat. No. 5,324,188, which is a continuation of Ser. No. 669,181, Mar. 13, 1991, abandoned, which is a continuation-in-part of Ser. No. 629,574, Dec. 18, 1990, abandoned.

[30] Foreign Application Priority Data

| Dec. 19, 1989 | [JP] | Japan | 1-330383 |
| Mar. 6, 1990 | [JP] | Japan | 2-52807 |
| Mar. 6, 1990 | [JP] | Japan | 2-52808 |
| Mar. 15, 1990 | [JP] | Japan | 2-62668 |
| Apr. 3, 1990 | [JP] | Japan | 2-87540 |
| Apr. 3, 1990 | [JP] | Japan | 2-87541 |

[51] Int. Cl.$^6$ .......................... B29D 11/00; B29D 17/00
[52] U.S. Cl. ............................ 264/1.33; 264/1.6; 425/810
[58] Field of Search ............................ 264/1.33, 1.38, 264/106, 107, 1.6; 360/135; 425/810; 156/275.1

[56] References Cited

U.S. PATENT DOCUMENTS

| Re. 34,765 | 10/1994 | Alexander et al. | 156/275.1 |
| 3,072,519 | 1/1963 | Salzman . | |
| 3,768,946 | 10/1973 | Matuschke . | |
| 3,874,836 | 4/1975 | Johnson et al. . | |
| 3,882,214 | 5/1975 | Nosker et al. . | |
| 3,893,795 | 7/1975 | Nauta . | |
| 4,016,603 | 4/1977 | Ottesen | 360/135 |
| 4,141,731 | 2/1979 | Jarsen . | |
| 4,397,805 | 8/1993 | Holmes . | |
| 4,430,401 | 2/1984 | Wilkinson . | |
| 4,836,874 | 6/1989 | Foster . | |
| 4,956,214 | 9/1990 | Imataki et al. . | |
| 4,968,370 | 11/1990 | Watkins . | |
| 5,026,510 | 6/1991 | Yashima . | |
| 5,048,745 | 9/1991 | Sato et al. . | |
| 5,075,060 | 12/1991 | Imataki . | |

FOREIGN PATENT DOCUMENTS

| 0015834 | 9/1980 | European Pat. Off. . |
| 0387037 | 9/1990 | European Pat. Off. . |
| 0395395 | 10/1990 | European Pat. Off. . |
| 2016228 | 10/1971 | Germany . |
| 56-86721 | 7/1981 | Japan . |
| 59-114031 | 6/1984 | Japan . |

Primary Examiner—Mathieu D. Vargot
Attorney, Agent, or Firm—Fitzpatrick, Cella, Harper & Scinto

[57] ABSTRACT

The present invention provides a process using a roll stamper which molds a substrate sheet for information recording mediums by continuously transferring preformat patterns on a resin sheet. The roll stamper has the feature that the preformat pattern on the roll stamper has a value of b/a of greater than 1 when the length of the preformat pattern in the direction parallel to the direction in which the resin sheet is transported is defined as a and the length in the direction perpendicular thereto as b.

6 Claims, 12 Drawing Sheets

PROCESS FOR PRODUCING SUBSTRATE SHEET FOR INFORMATION RECORDING MEDIUMS

This application is a division of application Ser. No. 08/083,056, filed Mar. 30, 1993, now U.S. Pat. No. 5,324,188, which is a continuation of application Ser. No. 07/669,181, filed Mar. 13, 1991, now abandoned, which is a continuation-in-part of application Ser. No. 07/629,574, filed Dec. 18, 1990, now abandoned.

BACKGROUND OF THE INVENTION

1. Field of the Invention

The present invention relates to a roll stamper for continuously producing substrates for information recording media by forming preformats on a resin sheet. It also relates to a process for producing the roll stamper.

2. Related Background Art

Preformats such as track grooves or address pits are formed on substrates for information recording media such as optical disks. As a method of continuously mass-producing such substrates, Japanese Patent Application Laid-open No. 56-86721 discloses a method in which a thermoplastic synthetic resin sheet is heated and softened using an infrared lamp and thereafter signals in the form of grooves or pits are transferred using a molding roll.

The roll stamper used in such a method is prepared by sticking a flat-plate thin stamper on a mirror-finished roll substrate with an adhesive or the like or mechanically fastening the stamper on the substrate by means of a jig or the like, or by directly forming a preformat pattern on the body of a roll substrate.

As the preformat pattern formed on the roll stamper is used a preformat pattern similar to those used in conventional methods in which the substrate is formed sheet by sheet as in the injection process, the compression process and the photopolymerization process (hereinafter "2P process"), which pattern is substantially circular, for example, in the case of a disk.

With regard to the accuracy of the preformat pattern provided on the stamper used in the conventional injection process, compression process or a 2P process, tracking errors tend to occur unless a deviation from a circle is controlled to be not more than 100 μm in the case of the disk.

When preformats are, however, continuously formed on a resin sheet, a relatively large pressure is applied to the roll stamper or shrinkage may occur with the cooling of resin, in a direction perpendicular to the direction in which the resin sheet is transported. Hence, in a case where the roll stamper on which the above substantially circular pattern has been formed is used, there is the problem that the preformat transferred onto the resin sheet causes a lowering of transfer accuracy, specifically, a lowering of the circularity or roundness. In particular, in the case of recording media like optical disks on which fine patterns are formed and information with a high density is recorded and reproduced, the lowering of the roundness may cause errors such as tracking-off.

This similarly is also similarly a problem in the case of molding a substrate for an optical card by a roll stamper, particularly resulting in a problem that the optical card substrate will become a defective product out of the specification due to the change in track pitch of the preformat pattern by shrinkage of the resin sheet, and it has been desired to have a countermeasure against the deformation of the preformat pattern accompanied with shrinkage of the resin sheet, particularly shrinkage in a direction vertical with respect to the conveying direction of the sheet.

SUMMARY OF THE INVENTION

The present invention was made taking account of the above problems. An object of the present invention is to provide a roll stamper used for molding a substrate sheet for information recording mediums, that can accurately form preformats in a continuous manner on a resin sheet, and a process for producing such a stamper.

Another object of the present invention is to provide a process for producing a substrate sheet for information recording media, that can obtain an information recording medium substrate sheet on which preformats have been accurately formed.

The roll stamper of the present invention for molding a substrate sheet for information recording mediums is a roll stamper which molds a substrate sheet for information recording mediums by continuously transferring preformat patterns on a resin sheet, wherein the preformat pattern on the roll stamper has a value of b/a of greater than 1 when the length of the preformat pattern in a direction parallel to the direction in which the resin sheet is transported is defined as $\underline{a}$ and the length in the direction perpendicular thereto as b.

The process of the present invention for producing a substrate sheet for information recording media is a process for producing a substrate sheet for information recording media, comprising continuously transferring preformat patterns on a resin sheet by the use of a roll stamper, wherein the preformat pattern on the roll stamper has a value of b/a of greater than 1 when the length of the preformat pattern in a direction parallel to the direction in which the resin sheet is transported is defined as a and the length in the direction perpendicular thereto as b.

The process for producing the roll stamper of the present invention is a process for producing a roll stamper which molds a substrate sheet for information recording media by continuously transferring preformat pattern on a resin sheet, comprising the steps of;

a) while an original plate having thereon a photoresist layer is rotated at a given number of revolution, vibrating a cutting head for cutting a pattern on the photoresist layer; corresponding to the preformat pattern, or vibrating the original plate, at a frequency twice the given number of revolution of the original plate and in the diameter direction of the original plate, thereby cutting the pattern on the photoresist layer, followed by development to form a resist pattern in which each track is elliptical and which has an elliptical shape having a value of b/a of greater than 1 when the length of the minor axis is defined as $\underline{a}$ and the length of the major axis as b, at the outermost track;

b) carrying out electroforming on the resist pattern to form a stamper having the preformat pattern; and c) fixing the stamper to a roll substrate in such a manner that the minor axis direction of said pattern is in accordance with the direction in which the resin sheet is transported.

The roll stamper for molding of the substrate sheet for the information recording medium of the present invention is a roll stamper having a preformat pattern corresponding to the preformat of the information recording medium, which is used for an transferring the preformat pattern onto a resin sheet in succession to mold a substrate sheet for an information recording medium, characterized in that when a predetermined length and width of the preformat of the information recording medium are defined as A and as B, respectively, the preformat pattern is formed to have a size of a length a corresponding to the above length A in the peripheral direction of the roll stamper and a width b corresponding to the above width B in a direction vertical with respect to the peripheral direction, and the value of b/a being greater than the value of B/A.

The roll stamper of the present invention is a roll stamper having a preformat pattern corresponding to the preformat of an information recording medium, which is used for transferring the preformat pattern onto a resin sheet in succession to mold a substrate sheet for an information recording medium, characterized in that a plurality of-the preformat patterns are formed in peripheral direction of the roll stamper and the preformat pattern, when a predetermined length and width of the preformat are defined as A and B, respectively, has a size of a length a corresponding to the above length A in the peripheral direction of the roll stamper and a width b corresponding to the above width B in a direction vertical with respect to the peripheral direction, and the value of b/a being greater than the value of B/A.

A process for preparing the roll stamper of the present invention is a process for preparing a roll stamper for molding of a substrate sheet for an information recording medium by transferring continuously a preformat pattern onto a resin sheet, having in the peripheral direction a plurality of preformat patterns corresponding to the preformat of an information recording medium, comprising the following steps:

a) the step of forming a plurality of preformat patterns corresponding to the preformat of the information recording medium on a lengthy base film in the lengthwise direction of the base film to prepare a base film master;

b) the step of forming an electroconducting film on the pattern formed surface of the base film master;

c) the step of forming a metal film on the electroconducting film according to an electroforming method;

d) the step of preparing a flexible stamper in a continuous length having a plurality of preformat patterns by peeling the electroconducting film and the metal film from the base film master;

e) the step of fixing the flexible stamper onto a roll substrate.

A process for preparing a substrate sheet for the information recording medium of the present invention is a process for preparing a substrate sheet for information recording medium, in which a preformat pattern is transferred successively onto a resin sheet by use of a roll stamper having the preformat pattern, characterized in that the preformat pattern, when a predetermined length and width of the preformat is defined as A and B, respectively, is formed to have a length a corresponding to the above length A in the peripheral direction of the roll stamper and a width b corresponding to a above width B in the direction vertical with respect to the peripheral direction, the value of b/a being greater than the value of B/A.

A process for preparing a flexible stamper in a continuous length comprises the steps of: preparing a base film master by forming a plurality of preformat patterns corresponding to the preformat of an information recording medium on the surface of a base film in a continuous length in the lengthwise direction of the base film; forming an electroconducting film on the pattern formed surface of the base film master; forming a metal film so as to be integral with the electroconducting film on the electroconducting film according to an electroforming method; and peeling the electroconducting film and the metal film from the base film.

A process for preparing a flexible stamper of the present invention comprises the steps of: forming an electroconducting film on the surface of a base film in a continuous length; forming a metal film on the electroconducting film according to an electroforming method, and forming a plurality of preformat patterns corresponding to the preformat of the information recording medium on the metal film in the lengthwise direction of the base film by use of a photo-lithographic process.

Further, the electroforming apparatus of the present invention is an electroforming apparatus for forming a metal film on a film made electroconductive while conveying continuously a base film master made electroconductive having a plurality of preformat patterns corresponding to the preformat of an information recording medium on the surface of a base film in a continuous length in the lengthwise direction of the base film, and an electroconducting film formed on the preformat pattern forming surface of the base film, which comprises means for keeping continuous contact with the electroconducting film to electrically connect the electroconducting film to a power source.

In this way the size of a preformat pattern is deviated from its standard shape in a specific range. It is thus possible to compensate the deformation of a preformat transferred onto a resin sheet, caused by the elongation of a stamper that may occur when a preformat is transferred onto a resin sheet and by the shrinkage due to cooling on the resin sheet, so that a very accurate preformat can be formed on the resin sheet.

BRIEF DESCRIPTION OF THE DRAWINGS

FIGS. 11A to 1id are diagrams of the steps of another preparation method of the flexible stamper shown in FIG. 7.

DESCRIPTION OF THE PREFERRED EMBODIMENTS

The roll stamper of the present invention for molding a substrate sheet for information recording mediums will be described below in detail with reference to the drawings.

Figure 1:
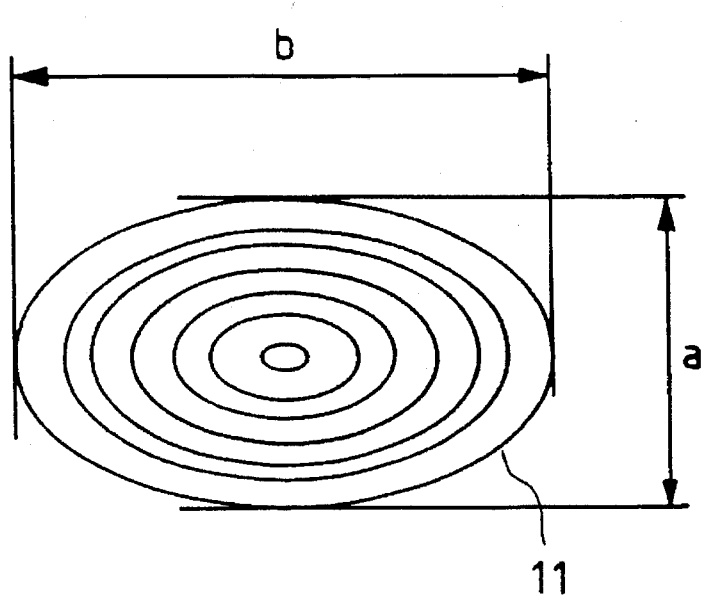
FIG. 1 diagramatically illustrates an embodiment of the pattern form of the roll stamper according to the present invention.

FIG. 1 diagrammatically illustrates a preformat pattern 11 formed on the stamper of the present invention. In FIG. 1, the letter symbol $\underline{a}$ represents the diameter in a direction parallel to the direction in which a resin sheet is transported, corresponding to the diameter of the outermost track of a pattern formed on the stamper. The letter symbol b represents the diameter of this pattern in the direction perpendicular to the direction in which the resin sheet is transported. The roll stamper of the present invention is characterized in that the value of b/a (the value of b divided by $\underline{a}$) is greater than 1.

Figure 8:
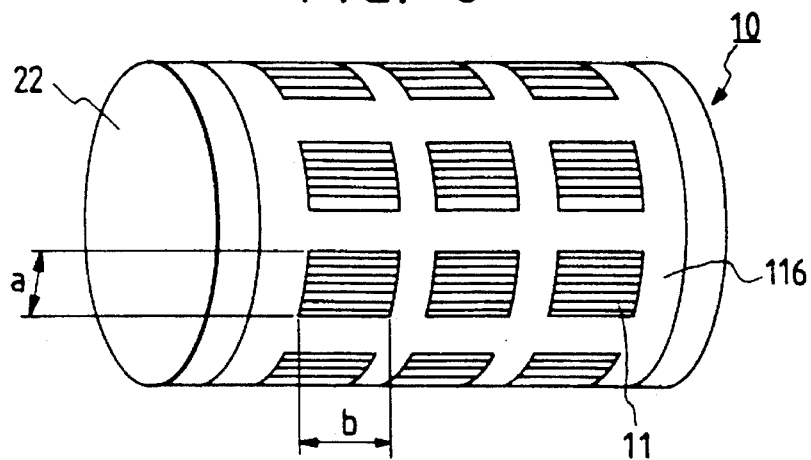
FIG. 8 is a schematic illustration showing another embodiment of the roll stamper of the present invention.

FIG. 8 illustrates schematically another roll stamper of the present invention, in which $\underline{a}$ indicates the length in the peripheral direction of the roll stamper of the track at the outermost side of the preformat pattern formed on the stamper, and b indicates the width in the direction vertical to the roll stamper, and such $\underline{a}$ and b correspond respectively to A and B which are the predetermined length and width of the preformat of the information recording medium, characterized in that the value of b/a is made greater than that of B/A.

In this way a difference is provided in the size ratio between the preformat pattern formed on the roll stamper and the standard shape of the preformat to be transferred to the resin sheet. It is thus possible to compensate for the deformation of a preformat transferred onto a resin sheet, caused by the elongation of a stamper that may occur when the resin sheet and the stamper are brought into contact and by the shrinkage of the resin sheet, so that a preformat can be very accurately formed on the resin sheet.

In the roll stamper of the present invention, the relation between $\underline{a}$ and b should satisfy the following expression (1), and, particularly when the preformat is formed on a molten resin sheet, should preferably satisfy the following expression (2).

$$0.05 \leq (b-a/a) \times 100 \leq 2 \quad (1)$$

$$0.1 \leq (b-a/a) \times 100 \leq 1 \quad (2)$$

Use of the stamper that satisfies the relation represented by the above expression makes it possible to particularly minimize the deformation of a preformat transferred onto the resin sheet, caused by the elongation of a stamper that may occur when the preformat is transferred onto the resin sheet and by the shrinkage of the resin sheet that may occur after the transfer.

There are no particular limitations on the shape and size of the preformat pattern formed on the roll stamper of the present invention and patterns with any shape and size can be used so long as they correspond to preformats formed on substrates of information recording mediums.

Grooves or pits formed on a substrate of an optical recording medium such as an optical disk or optical card on which information is recorded or reproduced by means of light are exemplified by tracking grooves in the form of concentric circles, a spiral or stripes, having a groove width of from 0.1 μm to 5 μm, a pitch of from 1 μm to 12 μm and a depth of from 0.01 μm to 0.4 μm, or information pits with a size on the micron order. A slight elongation or shrinkage in size of such grooves or pits which may occur when they are transferred brings about defects in the optical recording medium. Stated specifically, when, for example, a tracking groove for an optical disk is transferred to a resin sheet, an elongation in size on its outer diameter produces an eccentricity in the optical disk to cause tracking errors, making it impossible to carry out recording and reproducing. Accordingly, in the case of a disk pattern, the deviation of the size on its outer diameter from a circle should preferably be not more than 90 μm, particularly not more than 50 μm, and more particularly not more than 30 μm.

Thus the roll stamper of the present invention is capable of accurately transferring such fine patterns on a resin sheet, and is particularly effective for the production of substrates for optical recording mediums such as optical disks and optical cards.

Figure 2:
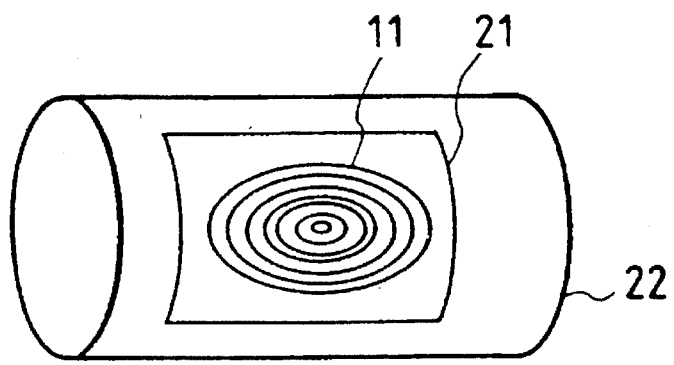
FIG. 2 diagrammatically illustrates an embodiment of a roll stamper, in which the stamper shown in FIG. 1 is fixed on a mirror-finished roll.

As an example for the process for producing the roll stamper of the present invention, a photoresist layer is formed on a glass plate for a master and a pattern is drawn using a laser beam or electron beam, which is then developed to form a resist pattern. The resist pattern is subjected to Ni-electroforming, thereby to give a thin Ni stamper. Next, as shown in FIG. 2, this Ni stamper 21 is fixed to a mirror-finished roll substrate 22 by using an adhesive or a jig. A roll stamper can be thus obtained. Alternatively, a preformat pattern may be formed directly on the roll substrate or on a pattern forming layer provided on the substrate.

Here, the value of b/a of the preformat pattern on the stamper can be set to a given value in the following manner. For example, in the case of an optical disk, the pattern of tracking grooves is prepared in a circular form, and the stamper thus prepared is stretched by applying a tension thereto in the direction perpendicular to the direction in which a resin sheet is transported. The resulting stamper is fixed to the roll substrate. The roll stamper of the present invention can be thus obtained.

In the case of a roll stamper for molding a substrate sheet for optical disks, the roll stamper can be produced in the following manner In the step of producing the the above Ni stamper, when a photoresist layer is formed on the glass plate for a master and a pattern is drawn on this resist layer by irradiation with a laser beam or the like, an optical head for carrying out irradiation with the laser beam while the glass plate for a master is rotated (hereinafter "cutting head") is vibrated in the diameter direction of the glass plate for a master at a frequency twice the number of revolution of the glass plate. An elliptical pattern can thereby be drawn and at the same time the difference between the major axis and the minor axis of this elliptical form can be made equal to the amplitude of vibration of the cutting head. Then, the Ni stamper obtained by Ni-electroforming using this glass plate may be fixed to the roll substrate in the manner that the direction of the minor axis of the elliptical pattern is in accordance with the direction in which a resin sheet is transported. Thus the roll stamper of the present invention for molding the substrate sheet for information recording medium can be produced. In this instance, a stamper having an elliptical pattern can be obtained without applying any tension to the stamper, and hence it is possible to prevent the stamper from being broken.

Figure 5:
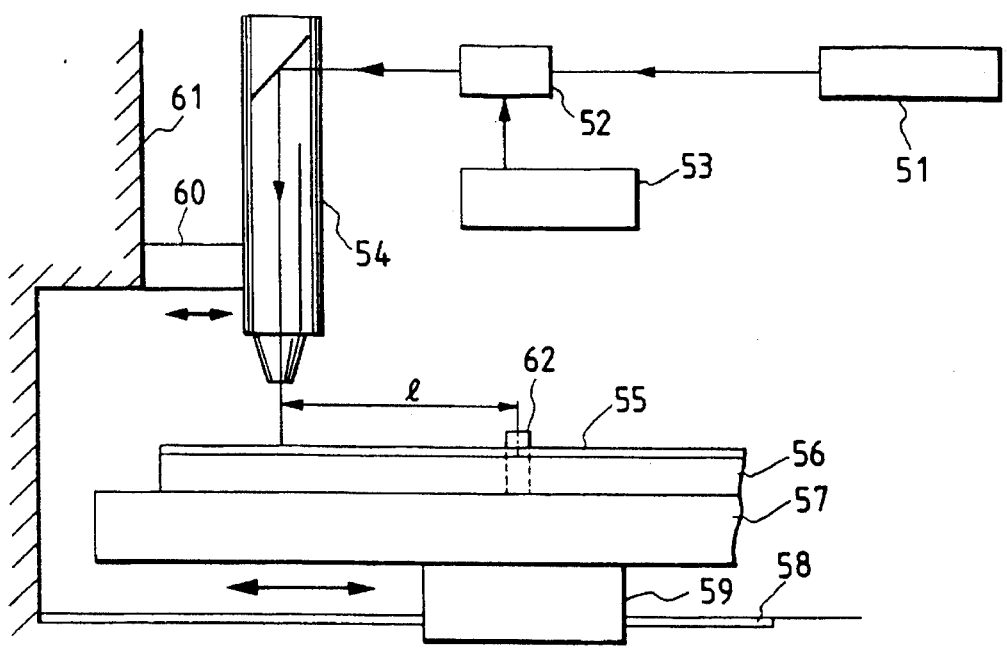
FIGS. 5 and 6 are each a schematic cross-sectional view of a cutting apparatus for a master used for the production of the roll stamper according to the present invention.

FIG. 5 illustrates an embodiment of a drawing apparatus for the master used in the production of this roll stammer.

In FIG. 5, the numeral 51 denotes a laser oscillator. A non-modulated laser beam is outputted from the laser oscillator 51. The numeral 53 denotes a modulated signal generator. A modulated signal corresponding to a pattern to be cut on a resist layer formed on an original plate 56, to be described later, for a master used for the stamper is outputted from the modulated signal generator 53. The numeral 52 denotes an optical modulator. In the optical modulator 52, the laser beam outputted from the above laser oscillator 51 is modulated corresponding to the modulated signal outputted from the above modulated signal generator 53, and the modulated laser beam is fed to a cutting head 54. Through the cutting head 54, the laser beam having been modulated though the optical modulator 53 is made to vertically downwards converge on the surface of a resist layer on the original plate 56, made of glass, for a master used for the stamper (hereinafter "glass original plate 56") which is placed on a turn table 57. The cutting head is supported in the manner that it is slidable in the diameter direction of the glass original plate 56 by means of a horizontally sliding mechanism (not shown), and a piezoelectric device 60 is provided between the side of the above cutting head 54 and a machine frame 61. The piezoelectric device 60 expands or contracts according to an alternating voltage applied from a control means (not shown) and hence can reciprocate the above cutting head 54 in the diameter direction of the glass original plate 56.

The glass original plate 56 is provided on its surface with a resist layer 55. A pattern is cut on the resist layer 55 by means of the laser beam made to converge through the cutting head. Beneath the turn table 57, a motor 59 for direct drive is fitted, the number of revolution of which can be precisely controlled by the operation of the above control means and the turn table 57 can be rotated the turn table 57 around a spindle 62. The motor 59 is supported by a horizontally sliding mechanism 58 in the manner that it is slidable in the right-and-left direction shown in the drawing, and also is equipped with a feed mechanism (not shown) so that it can be slided to a given position by the operation of the above control means. The control means gives a command to the modulated signal generator 53 to cause a modulated signal to be outputted at a given speed. In accordance with the speed, it also controls the number of revolution of the motor 59, the frequency of vibration of the piezoelectric device 60 and the position of the cutting head 54 and changes the amplitude of vibration of the piezoelectric device 60 in accordance with the position of the cutting head 54.

The process for producing the roll stamper according to the present invention will be described below with reference to FIG. 5.

The motor 59 is rotated at a predetermined number of revolution under the control by the control means (not shown), and thus the turn table 57 and the glass original plate 56 are rotated by the rotation of the motor 59. In this state, the feed mechanism (not shown) is driven so that the motor 59, the turntable 57 and the glass original plate 56 are slided using the slide mechanism 58 to effect alignment. A laser beam and a modulated signal are then outputted from the laser oscillator 51 and the modulated signal generator 53, respectively, which are modulated in the optical modulator 52 and a modulated laser beam is outputted to the cutting head. Then the modulated laser beam is shot onto the resist layer 55 on the surface of the glass original plate 56 and thus the cutting head 54 cuts the resist layer to form a pattern corresponding to the modulated signal. At this time, the control means described above is operated to cause the piezoelectric device 60 to vibrate in the diameter direction of the glass original plate 56 synchronizing with the revolution of the motor 54, thereby causing the cutting head 54 to vibrate at a frequency twice the number of revolution of the motor 59.

Here, the amplitude of vibration given to the cutting head 54 may be set in accordance with the value of b/a of the preformat pattern to be formed on the roll stamper.

This amplitude of vibration may also be controlled as a function of the distance l between the center of the glass original plate 56 (or the spindle 62 of the turn table 57) and a laser beam spot on the resist layer 55; in other words, the amplitude of variation may be made to vary for each track. This is preferred since the elliptical tracking groove or grooves having a constant ratio between the major axis and the minor axis can be formed over the whole track or tracks. As a proportional factor of the distance l the factor may also be determined in accordance with the material for a disk substrate, the speed of molding, etc. so that the preformat pattern can be more rounded on a resin sheet. In particular, when this proportional factor is set to range from 0.001 to 0.04, particularly from 0.002 to 0.02, the tracking grooves for a disk substrate can be accurately formed on a resin sheet.

Figure 6:
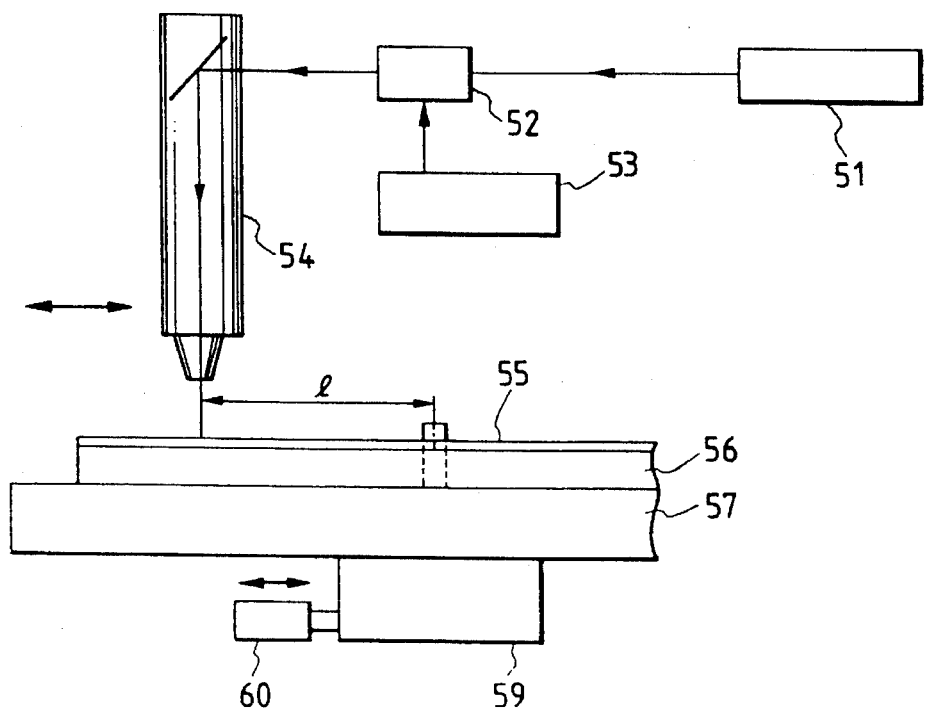

The cutting head may not be vibrated and instead the original master 56 may be vibrated as shown in FIG. 6.

After the cutting for one track is completed in this way, the motor 59, the turntable 52 and the glass original plate 56 are slided for one pitch (step feed) in the same way as in the above alignment, and then the pattern is cut on the resist layer formed on the glass original plate 56, in the same way as in the cutting described above. This operation is successively repeated to cut the resist layer on the glass original plate 56 to form thereon a preformat pattern for a disk. A resist pattern obtained by developing the resist layer is subjected to known steps such as post-baking, nickel sputtering, nickel electroforming, back polishing and external finishing. Thus a stamper having the preformat pattern 11 as shown in FIG. 1 can be obtained.

In FIG. 1, the letter symbol a represents the length of the minor axis of the outermost track; and b, the length of the major axis of the same track. The stamper having this preformat pattern is fixed to the roll substrate 22 in the manner that the direction of the minor axis of the above pattern may be in accordance with the direction in which a resin sheet is transported. Thus the roll stamper of the present invention for molding a substrate sheet for optical disks can be obtained.

In the above method of making the master, the amplitude of variation in the above vibration may be made substantially constant when the preformat pattern may not be in an excessively flat elliptical form and also it is unnecessary for the ratio of the major axis to the minor axis to be strictly equal over the whole track or tracks. In such an instance, it becomes unnecessary to provide the means for changing the amplitude of variation in proportion to the distance between the cutting head 54 and the center of the glass original plate 56, so that the cost can be lowered.

In the present invention, metals, semiconductors, dielectrics or alloys may be used as materials for the roll substrate. For example, aluminum, glass, hard metal, mold steel (e.g. maraging steel) may be used, which are materials feasible for mirror-finishing. Particularly preferred is Cr steel, which can be mirror-finished with ease.

Figure 9A:
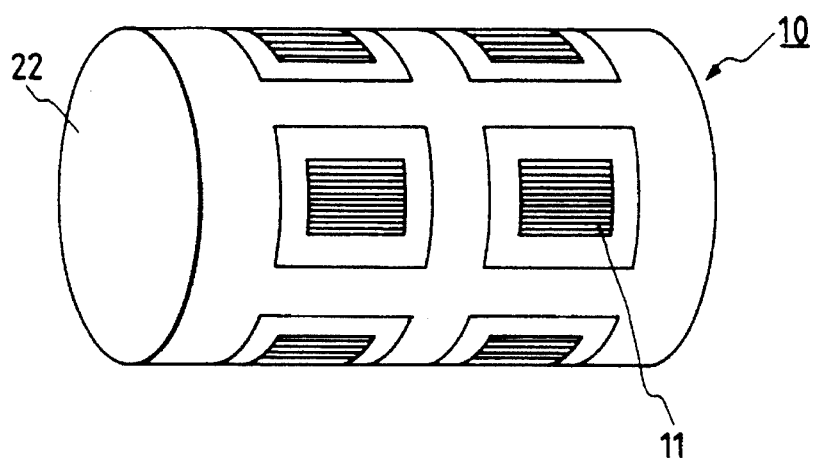
FIGS. 9A and 9B are schematic illustrations showing still another embodiment of the roll stamper of the present invention.
Figure 9B:
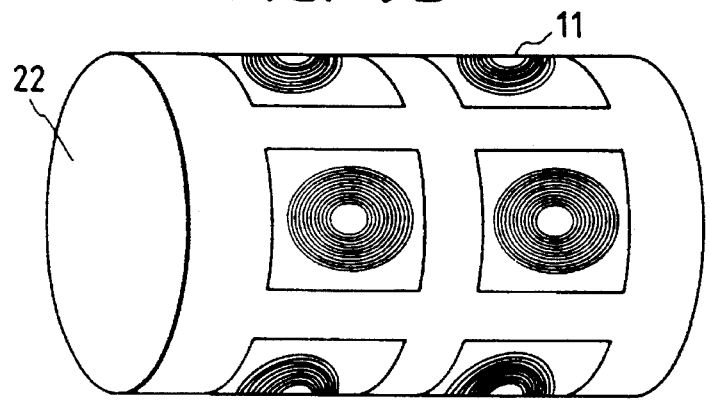

In the present invention, as shown in FIG. 7, a stamper 116 having a plurality of preformat patterns 11 arranged in the peripheral direction of the roll substrate can be used as the flexible stamper to be fixed on the roll substrate surface. When a roll stamper as shown in FIG. 8 is formed by use of such stamper, because unevenness on the surface of the roll stamper can be reduced to great extent as compared with the roll stamper as shown in FIG. 9 comprising one preformat pattern of the information recording medium formed on one flexible stamper and having a plurality of flexible stampers fixed on the peripheral surface of the roll substrate, a substrate sheet for a recording medium with good surface state can be obtained, whereby an information recording medium producing little noise can be prepared.

Such a flexible stamper having a plurality of preformat patterns 11 is formed by sputtering an electroconducting film 114 onto a glass master 101 having a plurality of resist patterns 102 corresponding to the preformat pattern of an information recording medium having the predetermined size of $a$ and b according to the method described above as shown in FIG. 10, then forming a metal film 115 to integrate the electroconducting films with the metal films and peeling the integrated films from the glass master to obtain a flexible stamper 116 having a plurality of preformat patterns 11.

By fixing the flexible stamper on the roll substrate 22 by means of a fixing implement shown in FIG. 15 or screwing, etc., it becomes possible to easily exchange the stamper, and yet a roll stamper which can be prepared inexpensively can be obtained.

Also, using the flexible stamper prepared above as the father stamper, coating and curing a UV-ray curable resin on the flexible stamper to prepare a mother stamper made of a resin and forming an electroconducting film and a metal film on the stamper, followed by peel-off, whereby the flexible stamper of the present invention, can be obtained. Further, the above-mentioned mother stamper can be also prepared by a casting method.

Further, using a base film master 113 comprising a plurality of resist patterns corresponding to preformat patterns formed on the base film 111 as shown in FIG. 11 in place of the glass master having a plurality of preformat patterns when the above-mentioned flexible stamper is prepared, an electroconducting film 114 is formed on the pattern formed surfaces of the base, film master, and subsequently a metal film 115 is formed by electroforming, so that a flexible stamper 116 having a plurality of preformat patterns 11 can be also obtained. In this case, the use of a film (base film) as the substrate for preparing the stamper enables a base film master having electroconducting films formed thereon to be wound up in a roll, and it becomes possible to apply continuously an electroforming treatment while delivering it out from the roll, if desired.

Figure 12A:
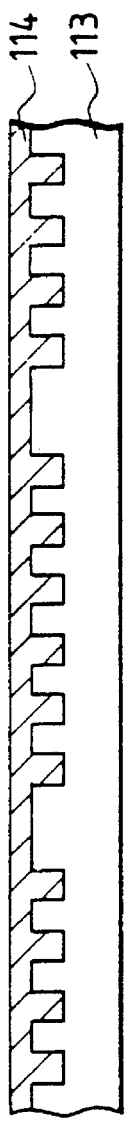
FIGS. 12A to 12C are diagrams of the steps of still another preparation method of the flexible stamper shown in FIG. 7.
Figure 12B:
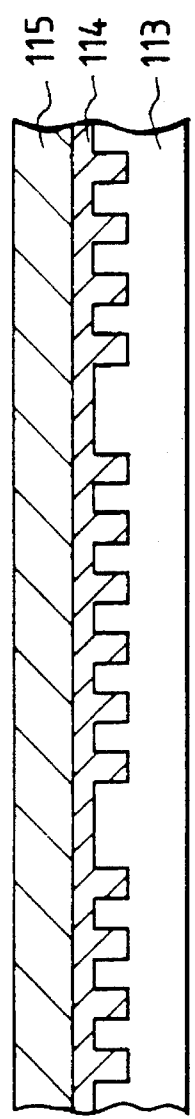
Figure 12C:
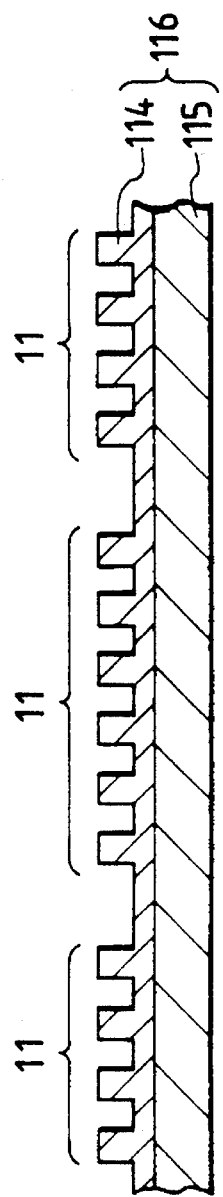

It is also possible to directly form preformat patterns 11 on the base film 111 as shown in FIG. 12 to form a base master 113, thereby obtaining a flexible stamper 116.

Next, the method of performing continuous electroforming treatment by use of a base film master is described.

Figure 13:
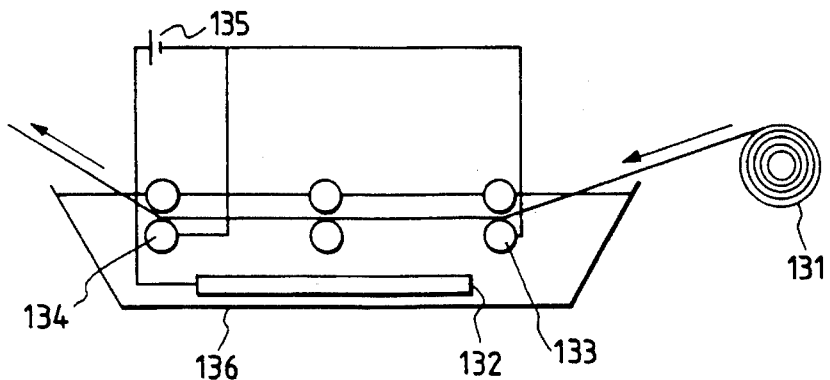
FIG. 13 is a schematic illustration of an electroforming apparatus to be used for preparation of the flexible stamper.

FIG. 13 is a schematic sectional view of an electroforming apparatus for carrying out continuously electroforming treatment by delivering a base film master 131 having an electroconducting film 114 wound up in a roll. In the same Figure, 132 denotes a metal chip 133 of nickel, etc. and 134 denotes a delivery roller and also a current passage means for providing a current passage between the electroconducting film 114 and the power source 135. As shown in FIG. 13, the nickel chip in the electroforming tank 136 and the electroconducting film 114 formed on the surface of the base film master are set on the+ side and the−side electrode, respectively, and the base film master 131 is delivered continuously into the electroforming solution.

Figure 14A:
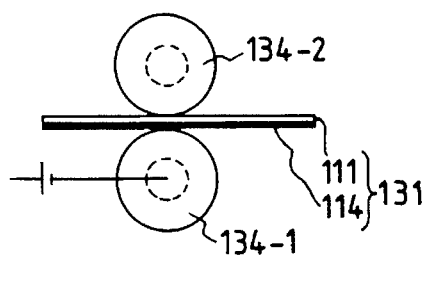
FIGS. 14A to 14C are schematic illustrations of a current passage means of the electroforming apparatus in FIG. 13.
Figure 14B:
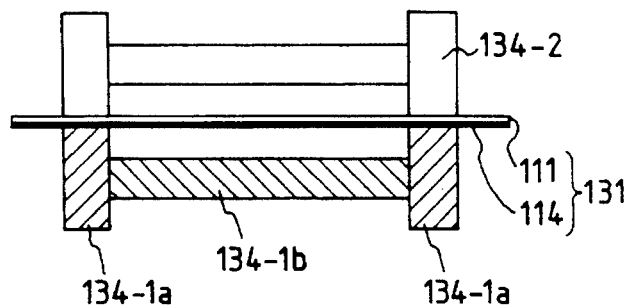

In this device, an enlarged view for the roll 133 which is the current passage means, is shown in FIG. 14. FIG. 14A is a side view of the roll and FIG. 14B a front view. Here, the rolls 133, 134 are each constituted so as to sandwich the base film master 131 between the rolls 133-1 and 133-2, and the roll 133-2 maintains continuously the contact state with the electroconducting film 114 of the base film master, with its contact portion comprising at least an electroconductive material connected to a power source. The present embodiment, as shown in FIG. 14B, is adapted to have the both ends of the roll 134-1 as the electroconductive portions 134-1$a$ and the small diameter portion positioned therebetween as the non-electroconductive portion 134-1$b$.

Figure 14C:
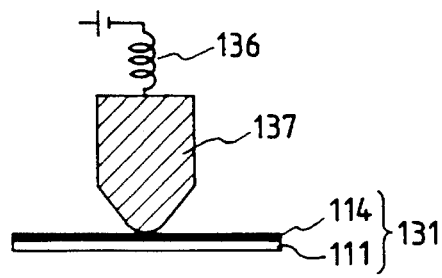

In the present invention, the means to electrically connect the electroconducting film 114 to the power source 135, is not limited to the above-mentioned roll-shaped one, provided that continuous contact stake with the electroconducting film can be maintained and conduction with the power source can be stably obtained. For example, as shown in FIG. 14C, the means comprising an electroconductive member 137 having a pressing means 136 such as a spring, etc. can be used.

In either case, the current passage sites may be only at the both ends of the base film master. The use of such a means eliminates the restriction in the lengthwise direction of the base film master, so that the length of the flexible stamper can be freely set corresponding to the sizes of the roll substrate and the preformat pattern.

While conveying the base film master, a nickel metal film of 100 to 200 μm is deposited under the electrolytic conditions of a time integrated value of the current flowed of 17 to 34 A·H (ampere·hour), subsequently the electroconducting film 114 and the metal film 115 in one body are peeled from the base film master, and the photoresist attached on the surface is removed, as a result a flexible stamper 116 having a desired number of preformat patterns can be obtained.

Figure 15A:
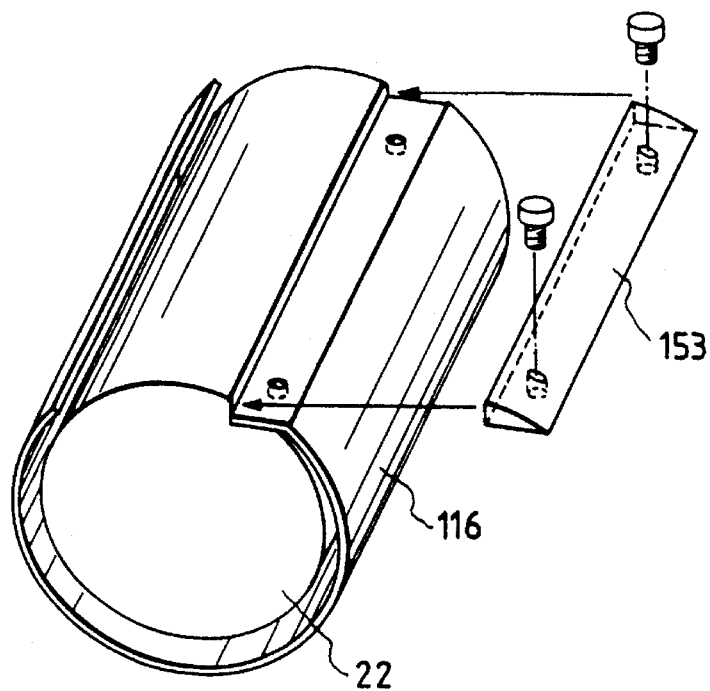
FIGS. 15A to 15C are views for explanation of the fixing method of the flexible stamper onto a roll substrate.
Figure 15B:
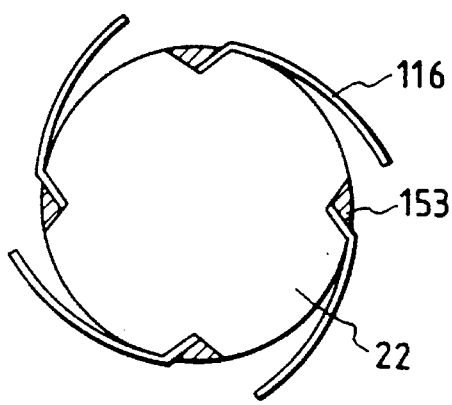

Finally, as shown in FIGS. 15A and 15B, the flexible stamper 116 is fixed between the roll substrate 22 and the stamper fixing implement 153 as shown in FIGS. 15A and 15B with the stamper fixing implement fixed onto the roll substrate with a screw, thereby fixing one to plural sheets of flexible stampers having a plurality of preformat patterns around the peripheral surface of the roll substrate on the peripheral surface of the roll substrate, so that the roll stamper of the present invention can be obtained.

Figure 15C:
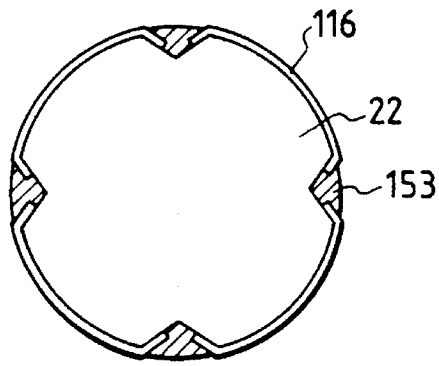

Also as shown in FIG. 15C, both ends of the flexible stamper 116 can be fixed with the stamper fixing implement and the screw to obtain the roll stamper of the present invention.

As the base film to be used in the preparation of the stamper described above, any one which can stand various conditions in an electroforming solution, for example, one excellent in acid resistance (pH 3 to 4) and heat resistance (50° to 70° C.) may be employed. For example, a polyester film is preferably used. The surface roughness of the base film should be desirable 50 to 100 Å.

Another embodiment of the preparation method of the flexible stamper 116 by use of the base film is described.

First, an electroconducting film 114 is formed on the base film 111 by sputtering, etc. and then a metal film 115 is formed according to the electroforming method, followed by polishing of the surface of a metal film.

As the polishing method, at least one of drying polishing or wet polishing is performed to preferably make the surface precision within ±3 Newton rings and the surface roughness 50 to 100 Å.

Next, according to the photolithographic steps, a plurality of resist patterns 161 corresponding to the preformat patterns for a plurality of information recording medium are formed, and then the metal film 115 is etched, whereby a flexible stamper 116 having a plurality of preformat patterns can be obtained.

Etching may be practiced according to an etching method such as dry etching, wet etching, etc.

In dry etching, for example, a metal film having a resist pattern formed thereon (electroformed film+electroconducting film+base film) can be etched with a reactive gas of $C_2F_6$ by means of a dry etching apparatus in which the metal film can rotate on its own axis, and equipped with an ion gun for etching. In wet etching, for example, while rotating the metal film (electroplated film+ electroconducting film+base film) on its own axis, etching is effected with a solution of hydrofluoric acid and fluorinated ammonia $NH_4F$ (1:7 weight ratio) for a time of about 1 minute.

After etching, $O_2$ plasma ashing is applied by use of $_{O2}$ to remove the residual resist and a fine pattern corresponding to the patterning pattern is formed on the metal film The flexible stamper 116 thus prepared is fixed on the roll substrate so as to be in contact with the peripheral surface of the roll substrate to obtain the roll stamper of the present invention.

An adhesive was coated on one surface of the base film, and a protective sheet was covered on the adhesive layer formed. Then, on the surface opposite to the side to the adhesive layer of the base film, the above respective steps may be also performed to form a plurality of preformat patterns.

The flexible stamper with one surface being an adhesion surface and having a plurality of predetermined patterns of the upper recording medium formed on the other surface can be also adhered directly onto a roll substrate to prepare a roll stamper.

Here, the adhesive is not particularly limited, but there can be generally used natural rubber, styrene-butadiene rubber, regenerated rubber, butyl rubber, butadiene-acrylonitrile rubber, polyacrylate and polyvinyl alkyl ether, etc. as the base polymer. Particularly, polyacrylates, etc. having excellent water resistance, heat resistance can be preferably employed. Also, double-coated tape, etc. may be also used as the adhesive. The protective sheet is not particularly limited, but any suitable one may be used in view of water resistance, heat resistance.

When a flexible stamper in a continuous length is thus prepared by use of a base film, when the size of external shape of the preformat of a given information recording medium is made A (length)×B (width) and the size of the preformat pattern to be formed on the flexible stamper made a (length)×b (width) corresponding to A, B as mentioned above, it is preferably formed to be b/a >B/A. By fixing the flexible stamper on the roll substrate so that the length (a) direction of the preformat pattern and the peripheral direction of the roll substrate may be consistent with each other, a roll stamper which can prevent distortion of the preformat by shrinkage of the resin sheet during extrusion molding can be obtained.

Figure 7A:
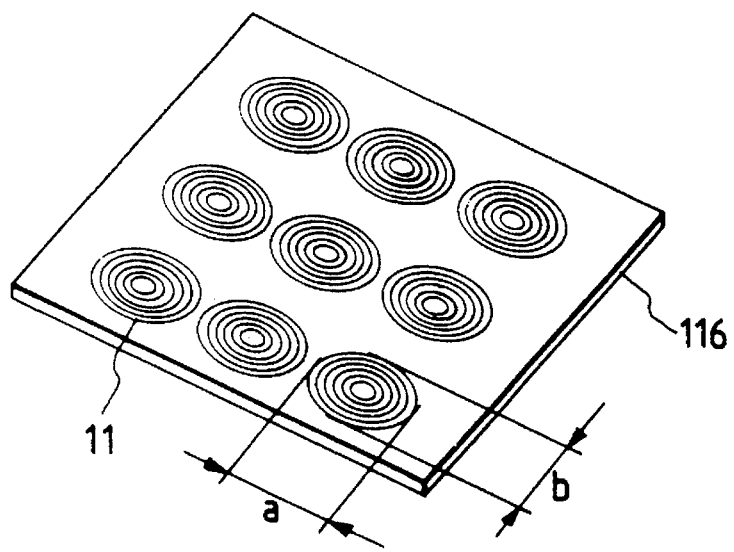
FIGS. 7A and 7B are schematic illustrations showing flexible stamper of the present invention, in which "A" is an optical disc and "B" is an optical card.
Figure 7B:
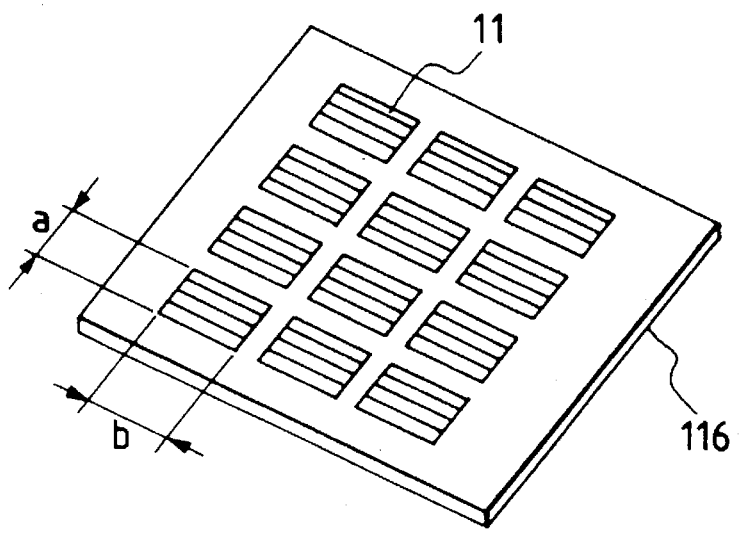

The present invention is also effective in the case where preparing a substrate sheet an optical card as shown in FIG. 7B. Particularly, as the preformat for an optical card, for example, as the track groove 171, one shaped in stripe with a groove width of 2.5 μm and a pitch 12 μm may be formed, and the track pitch 172 is determined by the standard to suppress its fluctuation within the range of 12 μm±0.1 μm, and if it is outside of this range, a error of recording and reproduction light is liable to occur. Accordingly, on molding a preformat for an optical card with a square shape of A×B size as show in FIG. 17 by extrusion molding, when the length of the roll stamper in the peripheral direction and the length in the direction perpendicular to the peripheral direction are defined as a and b for the lengths corresponding to the above-mentioned A and B, so that the value of b/a is made greater than that of B/A, the dimensions of the preformat patterns due to shrinkage accompanied with cooling of the resin sheet subjected to extrusion molding and transfer of the preformats can be corrected, whereby bulk production of substrates for optical card of high quality with little tracking error is rendered possible.

Further, when the present invention is applied to the roll stamper for optical card, and the relationships between A and a and between B and b are made as shown by the formulae (3) and (4), and the length and width of the preformat formed on the resin sheet is made a' and b', respectively, the values of a' and b' can be more approximated to A and B, whereby a roll stamper capable of forming an accurate preformat can be obtained.

$$0.05 \leq 100(a-A)/A \leq 0.1. \tag{3}$$

$$0.1 \leq 100(b-B)/B \leq 0.5. \tag{4}$$

Concerning B and b, particularly the relationship represented by the following formula (5) is preferred:

$$0.2 \leq 100(b-B)/B \leq 0.4 \tag{5}.$$

Figure 4:
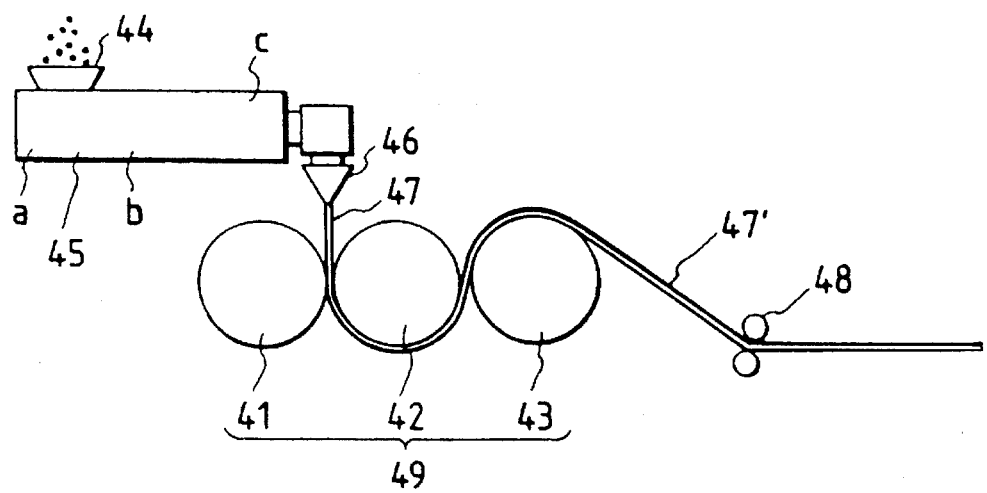
FIG. 4 diagrammatically illustrates an embodiment of the process for producing a substrate sheet for information recording mediums, using the roll stamper according to the present invention.

The process for producing a substrate sheet for information recording media, using the roll stamper of the present invention, will be described below with reference to FIG. 4. FIG. 4 diagrammatically illustrates an embodiment of the process for producing a substrate sheet for information recording mediums according to the present invention.

In FIG. 4, the numeral 45 denotes an extruder for carrying out extrusion; 46, a T-die; and 49, a pressure molding section, comprised of three rolls 41, 42 and 43.

At least one roll of these rolls serves as the roll stamper of the present invention. In the embodiment shown in FIG. 4, the roll 42 serves as the roll stamper, and the rolls 41 and 43 as mirror rolls.

First, resin pellets 44 put into the extruder 45 are heated and melted in the barrel of the extruder, pressed forward by a screw, and then formed into a sheet through the T-die. The temperature of the resin at this time may be in the range of from 260° C. to 330° C., and preferably from 280° to 320° C., in the case of, for example, a polycarbonate resin. From the T-die, the resin is continuously extruded in the form of a transparent molten resin sheet 47. The T-die is disposed in the manner that this molten resin sheet is extruded between the rolls 41 and 42 in the pressure molding section 49. The space between the tip of the T-die and the rolls 41 and 42 may preferably be set to be not more than 100 mm so that the resin can be prevented from being cured before it comes into contact with the rolls. The atmosphere that surrounds the T-die and the rolls may preferably be heated to a temperature of 60° C. or more.

Next, the resin sheet extruded between the rolls 41 and 42 is held between the heated roll 42 serving as the roll stamper and the roll 43 serving as a press roll, at which a preformat is transferred to the resin sheet.

The roll stamper of the present invention is kept at such a temperature that the resin used may not be cured on the rolls.

More specifically, the roll stamper may preferably be heated to a temperature within the range of +20° C. to −20° C. of the temperature at which the resin used is thermally deformed. When, for example, a polycarbonate resin is used, the roll stamper may preferably be heated to have a surface temperature of from 120° C. to 160° C. Namely, when the temperature is controlled in the above range, the molten resin sheet is not rapidly cooled and hence no strain due to shrinkage or the like tends to be produced in the resin sheet. The temperature of the press roll 43 in the pressure molding section may preferably be set to be the same as or a little lower than that of the roll stamper 42.

The temperature of these rolls can be controlled, for example, by electrically heating them using a heater casted in the roll or by circulating a heating medium at the center of the roll.

Next, the resin sheet 47' on which preformats have been formed is transported to take-off rolls 48. The take-off rolls 48 are rolls important to the continuous molding of the preformats, and are driven synchronously with the rolls in the pressure molding section 49. In other words, these two sets of rolls have the same peripheral speed, and are preferably constructed in the manner that no stress due to a stretch or the like may act on the resin sheet between them. Taking such construction makes it possible to prevent an optical anisotropy from being produced at the interior of the resin sheet.

The thickness of the substrate sheet 47' for optical recording media depends on the gap or space between the rolls in the pressure molding section 49, the divergence between lips of the T-die, and the drawdown that is governed by the ratio of extrusion speed to stress rate, i.e., the degree of a stretch.

The sheet thickness is commonly controlled by making the divergence between lips of the T-die greater by 20 to 200% than the desired sheet pressure so that the drawdown is increased. In the present invention, however, the drawdown should be controlled to be from 50 to 150% in order to prevent the optical anisotropy or sheet thickness uneveness caused by a strain ascribable to drawdown.

Another manufacturing method of the present invention also provides a substrate sheet for information recording media having accurate preformats by heating and softening a resin sheet previously formed and then pressing the roll stamper of the present invention against it to transfer the preformat.

As described above, the roll stamper of the present invention and the process for producing a substrate sheet for information recording media by the use of the roll stamper make it possible to accurately transfer preformats onto a resin sheet.

It has also become possible to continuously produce a resin sheet on which preformats have been accurately transferred.

Further, according to the present invention in which a stamper having a plurality of preformat patterns on one sheet of flexible stamper is used as the roll stamper, the unevenness of the roll stamper surface can be reduced to great extent, and also the number of the fixing implements of the stamper can be made smaller, and a substrate for information recording medium with good surface state can be obtained.

Further, molding of a substrate for information recording medium by use of the roll stamper of the present invention enable the production cost of the substrate for information recording medium to be lowered to provide an inexpensive information recording medium.

Also, according to the preparation process and the electroforming apparatus of the flexible stamper of the present invention, a stamper in a continuous length having a plurality of preformat patterns can be prepared with ease, whereby the production cost of the roll stamper can be lowered to great extent.

EXAMPLES

The present invention will be described below in greater detail by giving Examples.

Example 1

Using the apparatus as shown in FIG. 5, cutting was carried out on a glass original plate having thereon a photoresist layer, at the part defined by the distance l of from 21 mm to 44.5 mm from the center of the glass original plate while the glass original plate was rotated at 900 rpm. At this time an alternating voltage of 900/60×2=30 Hz was applied to the piezoelectric device to cause the cutting head to vibrate in the diameter direction of the glass original plate. The amplitude of variation at this time was varied to be 0.0039×l (m/n) in accordance with the distance l between the cutting head and the center of the glass original plate. The feed speed of the motor, the turntable and the glass original plate was set to be 24 μm/s.

After the cutting was carried out in this way, development was carried out to give a resist pattern in a spiral form with an elliptical shape of 89.000 mm in length (a) of the minor axis and 89.174 mm in length (b) of the major axis, corresponding to a tracking groove having, at a convex part, a width of 0.6 μm, a pitch of 1.6 μm and a height of 1,000 Å. Next, this resist pattern was subjected to Ni electroforming to prepare a stamper. The resulting stamper was adhered with an adhesive (trade name: SC-55; available from Sony Chemicals K.K.) to a roll substrate in the manner that the direction of the minor axis of the stamper was in accordance with the direction in which a resin sheet is transported. A roll stamper was thus produced.

Using this roll stamper, the apparatus for producing a substrate sheet for optical recording mediums, as shown in FIG. 4, was set up. In the manner as shown in FIG. 4, the substrate sheet for optical recording mediums was prepared using an extruder having an screw of 35 mm in diameter and a coat hanger type T-die of 20 cm in width, downwards provided to the body of the extruder.

A polycarbonate resin (trade name: Panlite L-1250; available from Teijin Chemicals Ltd.) was used as the resin. The pressure molding section 49 was comprised of the rolls 41 and 43 serving as mirror rolls, and the roll 42 serving as the roll stamper previously prepared.

The resin sheet was extruded under conditions of extruder barrel temperatures of 300° C. at the part a (Ta), 300° C. at the part b (Tb) and 320° C. at the part c (Tc) of the extruder 45 and a T-die temperature Td of 20° C., under which a molten resin sheet was formed. At this time the resin temperature was in the range of 280° C. to 330° C.

The roll stamper 42 was kept at a temperature of 140° C. The roll 41 was kept at a temperature lower than that of the roll 42 by 1° to 2° C., and the roll 43 was kept at a temperature higher than that of the roll 32 by 20° to 21° C.

The space between the lips of the T-die and the pressure molding section was set to be 50 mm, and it was surrounded with a heating box to perform control so that the atmosphere from the extrusion of the resin to the pressure molding section was kept at 60° C. or higher. The divergence between the lips of the T-die was set to 0.48 mm and the gap between the rolls 41 and 42 in the pressure molding section was set to 1.2 mm, under the conditions of which the preformat pattern of the roll stamper 42 was transferred to the resin sheet to carry out the production of a substrate sheet for optical recording media with a thickness of 1.2 mm.

Figure 3:
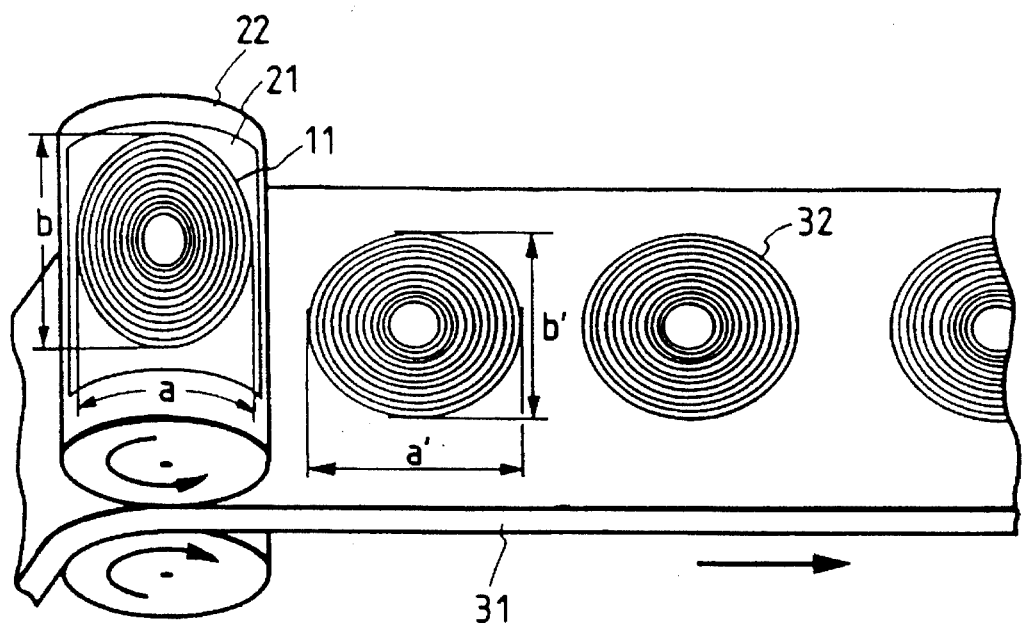
FIG. 3 schematically illustrates the process of transferring preformat patterns on a resin sheet, using the roll stamper according to the present invention.

The resin sheet was molded at a speed of 2 m/min. With respect to the preformats thus formed on the substrate sheet for information recording media, thus formed, the length of the preformat in the direction parallel to the direction in which the resin sheet was transported was represented by a' and the length in the direction perpendicular thereto by b' as shown in FIG. 3. The lengths a' and b' were measured and the deviation of b' when viewed on the basis of a' was regarded as the amount of deviation from a circle. This measurement was made on three samples selected at random. Results obtained are shown in Table 1.

TABLE 1

| Sample No. | a' (mm) | b' (mm) | Amount of deviation from circle (μm) | Amount of amplitude of tracking error signals |
|---|---|---|---|---|
| 1 | 88.689 | 88.684 | 5 | AA |
| 2 | 88.687 | 88.683 | 4 | AA |
| 3 | 88.689 | 88.685 | 4 | AA |

Subsequently, substrates were cut out from the substrate sheet for optical recording media on which the above measurement was made. Thereafter, aluminum was deposited in a thickness of 1,000 Å to produce optical disks.

The resulting optical disks were evaluated using an optical disk evaluation apparatus (trade name: OMS-1000 Type III; manufactured by Nakamichi K.K.) by measuring the amplitude of the tracking error signals. The case in which the amplitude at this time was less than 0.2 V was evaluated as "AA", the case of from 0.2 V to less than 0.4 V as "A", the case of from 0.4 V to less than 1.0 V as "B", and the case of 1.0 V or more up to tracking-off as "C".

Example 2

Using the same apparatus as used in Example 1, cutting was carried out on a glass original plate having thereon a photoresist layer, at the part defined by the distance Q of from 20 mm to 44.5 mm from the center of the glass original plate while the glass original plate was rotated at 1,200 rpm. At this time an alternating voltage of 1,200/60×2=40 Hz was applied to the piezoelectric device to cause the cutting head to vibrate in the diameter direction of the glass original plate while the amplitude of variation was varied to be 0.0118×l (mm) in accordance with the distance l between the cutting head and the center of the glass original plate.

In this way, a resist pattern was obtained in a spiral form with an elliptical shape of 89.000 mm in length (a) of the minor axis and 89.525 mm in length (b) of the major axis, corresponding to a tracking groove for an optical disk. Next, this resist pattern was subjected to Ni electroforming to prepare a stamper. The resulting stamper was adhered with an adhesive to a roll substrate in the manner that the direction of the minor axis of the stamper was in accordance with the direction in which a resin sheet is transported. A roll stamper was thus produced. Subsequently, using this roll stamper, the substrate sheet for optical disks was prepared in the same manner as in Example 1 by continuously transferring optical disk preformats onto the resin sheet formed by extrusion.

With respect to the preformats thus obtained on the substrate sheet for information recording mediums, the amount of deviation from a circle was measured in the same manner as in Example 1. Substrates for optical disks were also cut out from this substrate sheet to produce optical disks, and the amplitude of tracking error signals was measured. Results obtained are shown in Table 2.

TABLE 2

| Sample No. | a' (mm) | b' (mm) | Amount of deviation from circle (μm) | Amount of amplitude of tracking error signals |
|---|---|---|---|---|
| 1 | 88.733 | 88.764 | 31 | AA |
| 2 | 88.732 | 88.761 | 29 | AA |
| 3 | 88.729 | 88.761 | 32 | AA |

Example 3

In the same manner as in Example 1, the roll stamper of the present invention was prepared and preformats for optical disks were transferred to the resin sheet formed by extrusion. In the present Example, the preformat pattern on the roll stamper was in an elliptical shape of 89.423 mm in length (a) in the direction parallel to the direction in which the resin sheet is transported and 89.793 in length (b) in the direction perpendicular to the direction in which the resin sheet is transported, and so formed as to correspond to tracking grooves having, at a convex part, a width at the land, of 0.6 μm, a pitch of 1.6 μm and a height of 1,000 Å.

With respect to the preformats thus obtained on the substrate sheet for information recording media, measurement was made in the same manner as in Example 1. On optical disks prepared from the substrate sheet, the amplitude of tracking error signals was also measured. Results obtained are shown in Table 3.

TABLE 3

| Sample No. | a' (mm) | b' (mm) | Amount of deviation from circle (μm) | Amount of amplitude of tracking error signals |
|---|---|---|---|---|
| 1 | 88.996 | 88.992 | 4 | AA |
| 2 | 88.995 | 89.001 | 6 | AA |
| 3 | 89.000 | 88.995 | 5 | AA |

Example 4

A substrate sheet for optical disks was continuously formed in the same manner as in Example 1 except that the preformat pattern formed on the roll stamper was made to be 89.023 in length (a) and 89.793 in length (b).

With respect to the thus formed preformats of the substrate sheet for optical disks, thus formed, measurement and evaluation were made in the same manner as in Example 1. Results obtained are shown in Table 4.

TABLE 4

| Sample No. | a' (mm) | b' (mm) | Amount of deviation from circle (μm) | Amount of amplitude of tracking error signals |
| --- | --- | --- | --- | --- |
| 1 | 89.029 | 89.003 | 26 | A |
| 2 | 89.021 | 88.989 | 32 | A |
| 3 | 89.032 | 89.011 | 21 | AA |

Examples 5 to 8

Substrate sheets for optical disks were continuously formed in the same manner as in Example 1 except that the preformat patterns formed on the roll stampers were made to have the lengths a and b as shown in the following Table 5. With respect to the preformats formed on the substrate sheet for optical disks, measurement and evaluation were made in the same manner as in Example 1.

Reference Examples 1 and 2

Substrates for optical disks were prepared in the same manner as in Example 1 except that the preformat patterns formed on the roll stampers were made to have the lengths a and b as shown in Table 5. With respect to the preformats formed on the substrate sheet for optical disks, measurement of size and an evaluation were made.

Results of Examples 5 to 8 and Reference Example 1 and 2 are shown in Table 5.

direction. The amplitude of variation at this time was varied to be $0.0042 \times l$ (mm) in accordance with the distance l between the cutting head and the center of the glass original plate.

After the cutting was carried out in this way, development was carried out to give a resist pattern in a spiral form with an elliptical shape of 89.000 mm in length (a) of the minor axis and 89.187 mm in length (b) of the major axis, corresponding to a tracking groove having, at a convex part/a width of 0.6 μm, a pitch of 1.6 μm and a height of 1,000 Å. Next, this resist pattern was subjected to Ni electroforming to prepare a stamper. The resulting stamper was adhered with an adhesive (trade name: SC-55; available from Sony Chemicals K.K.) to a roll substrate in the manner that the direction of the minor axis of the stamper was in accordance with the direction in which a resin sheet is transported. A roll stamper was thus produced.

Using this roll stamper, a plurality of preformats for optical disks were transferred onto a polycarbonate resin sheet formed by extrusion, in the same manner as in Example 1. A substrate sheet for optical disks was thus produced. With respect to the preformats on this substrate sheet, measurement and evaluation were made in the same manner as in Example 1.

Example 8

Using the same apparatus as used in Example 9, cutting was carried out on a glass original plate having thereon a

TABLE 5

| | Preformat pattern on stamper | | Sample No. | Preformat on resin sheet | | Amount of deviation from circle (μm) | Amount of ampltitude of tracking error signals |
| --- | --- | --- | --- | --- | --- | --- | --- |
| | a (mm) | b (mm) | | a' (mm) | b' (mm) | | |
| Example: | | | | | | | |
| (b − a/a) × 100 = 0.05 | 89.752 | 89.797 | 1 | 89.046 | 89.005 | 41 | A |
| | | | 2 | 89.056 | 89.011 | 45 | A |
| | | | 3 | 89.051 | 89.008 | 43 | A |
| 6 | 89.685 | 89.775 | 1 | 89.001 | 89.004 | 3 | AA |
| (0.1) | | | 2 | 88.999 | 89.003 | 4 | AA |
| | | | 3 | 89.001 | 89.003 | 2 | AA |
| 7 | 88.981 | 89.880 | 1 | 88.980 | 89.002 | 22 | AA |
| (1) | | | 2 | 88.979 | 88.999 | 20 | AA |
| | | | 3 | 88.983 | 89.004 | 21 | AA |
| 8 | 88.192 | 89.956 | 1 | 88.989 | 89.085 | 96 | B |
| (2) | | | 2 | 88.988 | 89.086 | 98 | B |
| | | | 3 | 88.992 | 89.081 | 89 | A |
| Reference Example: | | | | | | | |
| 1 | 89.783 | 89.792 | 1 | 89.174 | 88.994 | 180 | C |
| (0.01) | | | 2 | 89.179 | 89.003 | 176 | C |
| 2 | | | 3 | 89.172 | 88.989 | 183 | C |
| (3) | 87.518 | 90.225 | 1 | 88.906 | 89.094 | 188 | C |
| | | | 2 | 88.902 | 89.090 | 188 | C |
| | | | 3 | 88.903 | 89.094 | 191 | C |

Example 7

Using the apparatus as shown in FIG. 6, cutting was carried out on a glass original plate having thereon a photoresist layer, at the part defined by the distance l of from 20 mm to 44.5 mm from the center of the glass original plate while the glass original plate was rotated at 900 rpm. At this time an alternating voltage of $900/60 \times 2 = 30$ Hz was applied to the piezoelectric device to cause the motor, the turntable and the glass original plate to vibrate in the right-and-left photoresist layer, at the part defined by the distance l of from 20 mm to 44.5 mm from the center of the glass original plate while the glass original plate was rotated at 600 rpm. At this time an alternating voltage of $600/60 \times 2 = 20$ Hz was applied to the piezoelectric device to cause the motor, the turntable and the glass original plate to vibrate in the diameter direction of the glass original plate while the amplitude of variation was varied to be $0.014 \times l$ (mm) in accordance with the distance l between the cutting head and the center of the glass original plate, After the cutting was carried out in this way, development was carried out to give a resist pattern in a spiral form with an elliptical shape of 89.000 mm in length (a) of the minor axis and 89.623 mm in length (b) of the major axis, corresponding to a tracking groove having, at a convex part, a width at the land, of 0.6 μm, a pitch of 1.6 μm and a height of 1,000 Å. Next, this resist pattern was subjected to Ni electroforming to prepare a stamper. The resulting stamper was adhered with an adhesive (trade name: SO-55; available from Sony Chemicals K.K.) to a roll substrate in the manner that the direction of the minor axis of the stamper was in accordance with the direction in which a resin sheet is transported. A roll stamper was thus produced.

Using this roll stamper, a plurality of preformats for optical disks were transferred onto a polycarbonate resin sheet formed by extrusion, in the same manner as in Example 1. A substrate sheet for optical disks was thus produced. With respect to the preformats on this substrate sheet, measurement and evaluation were made in the same manner as in Example 1.

Results of the above Examples 7 and 8 are shown in Table 6.

TABLE 6

| Example: | Preformat pattern on stamper | | Sample No. | Preformat on resin sheet | | Amount of deviation | Amount of ampltitude of |
| --- | --- | --- | --- | --- | --- | --- | --- |
| | a (mm) | b (mm) | | a' (mm) | b' (mm) | from circle (μm) | tracking error signals |
| 7 | 89.000 | 89.187 | 1 | 88.563 | 88.590 | 27 | AA |
| (b − a/a) × | | | 2 | 88.559 | 88.589 | 30 | AA |
| 100 = 0.21 | | | 3 | 88.611 | 88.641 | 30 | AA |
| 8 | 89.000 | 89.623 | 1 | 88.849 | 88.861 | 12 | AA |
| (0.7) | | | 2 | 88.842 | 88.857 | 15 | AA |
| | | | 3 | 88.854 | 88.865 | 11 | AA |

Example 11

A flexible stamper having 9 preformat patterns as shown in FIG. 7A was prepared.

This stamper was prepared as shown in FIG. 10 by spinner coating a photoresist (trade name: AZ-1370, produced by Hoechst Japan) to a thickness of 3000 Å on a glass substrate of 450 mm×450 mm×20 mm (thickness), followed by pre-baking under the conditions of 90° C., 30 minutes.

Next, in the same manner as in Example 1, 9 resist patterns with a width of 0.6 μm, a pitch of 1.6 μm and a depth of 1000 Å at the portion corresponding to the track grooves shaped in ellipsoidal spiral with a length of shorter axis of a (89.222 mm) and a length of longer axis (width) of b (89.344 mm) were prepared.

As the pre-treatment for forming a metal film according to the electroforming method, electroconducting treatment was carried out by use of a sputtering apparatus to form a nickel film with a film thickness of 1000 Å to 2000 Å, thereby forming an electroconducting film 114 on a glass master.

Next, as shown in the same Figure (D), on the electroconducting film was formed a nickel film 115 with a thickness of 100 to 200 μm according to the electroforming method (step D).

The electroforming solution used here had a composition as shown below.

Nickel sulfamate.tetrahydrate [Ni(NH$_2$SO$_3$)$_2$.4H$_2$O] 500 g/liter

Boric acid [H$_3$BO$_3$] 35–38 g/liter

Pit preventive 2.5 ml/liter.

Finally as shown in FIG. 10E, the electroconducting film and the metal film in one body are peeled at the same time from the glass master, and the photoresist attached on the surface was removed to obtain a flexible stamper with a size of 440 mm×400 mm as shown in FIG. 7A having formed preformat patterns corresponding to the spiral-shaped guide grooves with a=89.222 mm, b=89.340 mm, line-and-space:1.6 μm/0.6 μm, stepped difference: 1000 Å (step E). Two sheets of the flexible stamper thus obtained were screwed at both ends of the stamper 116 from above the fixing implements 153 as shown in FIG. 15B, and fixed on the roll substrate with a diameter of 300 mm so that the shorter axis of the preformat pattern may coincide with the peripheral direction of the roll substrate to prepare a roll stamper.

Next, by use of the roll stamper, an apparatus for preparing a substrate sheet for optical disc shown in FIG. 4 was prepared.

As shown in FIG. 4, a substrate sheet for an optical recording medium was prepared by use of an extrusion molding machine using a coat hanger type T-die with a 20 cm width set downwardly at the extruder 1 with a screw diameter of 35 mm.

As the resin, a polycarbonate resin (trade name: Panlite L-1250; produced by Teijin Kasei) was employed. The pressure molding portion 49 has mirror surface rolls for the rolls 41, 43, and the roll stamper prepared above for the roll 42.

A molten resin sheet was formed under the extrusion conditions of the resin sheet, namely at the barrel temperatures of the extruder 45 at the a portion (Ta) of 300 ° C., at the b portion (Tb)=300° C., the c portion (Tc)=320° C., and the temperature of the T-die 46 of Td=320° C. The resin temperature at this time was 280° C. to 320° C.

The roll stamper 42 is maintained at 140° C., and the roll 41 was maintained at a temperature 1° to 2° C. lower than that of the roll 42, and the roll 43 at a temperature 20° to 21° C. higher than that of the roll 42.

The gap between the lip of the T-die and the pressure molding portion was made 50 mm, and the atmosphere from extrusion of the resin sheet to the pressure molding portion was controlled by enclosing therearound with a heating box so that it became 60° C. or hiqher. The lip opening of the T-die was made 1.5 mm and the nap between the rolls 41, 42 at the pressure molding portion 1.2 mm, under which conditions the preformat patterns of the roll stamper 42 were transferred onto the resin sheet to prepare a substrate sheet for an optical disc with a thickness of 1.2 mm.

The resin sheet was molded at a speed of 2 m/min. For the preformat on the substrate sheet for the information recording medium thus formed, when the length in a direction parallel to the conveying direction of the resin sheet of the preformat is made a' and the length in the direction vertical thereto b', the a' and b' are measured, and the deviation of b' from a' taken as a standard is defined as the deviated quantity from true sphere. The measured value is an average of 18 samples obtained by molding of one rotation of the roll stamper. The results are shown in Table -7.

TABLE 7

| Sample | a' (mm) | b' (mm) | Deviated quantity from true sphere | Amplitude quantity of tracking error signal |
| --- | --- | --- | --- | --- |
|  | 88.688 | 88.684 | 4 | ⊚ |

Next, the substrate for an optical disc subjected to the above measurement: was cut off from the sheet, and then aluminum was vapor deposited to prepare an optical disc.

The optical disc was evaluated by an optical disc evaluation apparatus (trade name: OMS-1000, Type III; produced by Nakamichi K.K.), and the amplitude of tracking error signal was measured. However, at this time, the case when the amplitude was 0.2 V or less was shown by ⊚, the case of 0.2 to 0.4 V by , the case of 0.4 to 1.0 V by Δ, and the case when tracking is impossible by x.

Example 12

The stamper for optical disc shown in FIG. 7A was prepared according to the method shown in FIG. 11. First, a photoresist layer was formed on the base film 111 of a polyester with a thickness of 0.2 mm, a width of 460 mm and a length of 3 m. For the photoresist, Az 1300* 4.6 cp (produced by HoechstJapan) was employed, which was coated by a base film coater to a film thickness of 1000 Å. Then, prebaking was carried out under the conditions of 90° C., 30 min.

Next, according to the same method as in Example 11, a resist pattern for optical disc was prepared.

Subsequently, the electroconducting film 114 to of nickel was formed on the resist pattern a thickness of 1000 Å by sputtering. The base film master was wound up in a roll and a nickel film was formed to a thickness of 220 μm on the electroconducting film by use of an electroforming apparatus shown in FIG. 13. The delivery speed of the base film master was made 40 mm/min. Electrolysis was carried out by use of an electroforming solution of:

Nickel sulfamate.tetrahydrate [Ni $(NH_2SO_3)_2.4H_2O$]500 g/liter

Boric acid [$H_3BO_3$]35–38 g/liter

Pit preventive 2–5ml/titer under the conditions of 250 AH.

Next, the electroconducting film and the metal film were peeled from the base film master to obtain a flexible stamper in continuous length.

The stamper was cut in conformity with a roll substrate of 300 mm in diameter, and adhered directly onto a stamper fixing implement 153 by use of a cyanoacrylate type adhesive (trade name SC-55, Sony Chemical K.K.) and fixed on the roll substrate so that the short axis direction of the preformat pattern may be consistent with the peripheral direction of the roll substrate, followed by fixing of the stamper fixing implement having the flexible stamper fixed thereon by screwing onto the roll substrate to obtain a roll stamper having 18 preformat patterns.

By use of the roll stamper, a substrate sheet for an optical disc was molded in the same manner as in Example 11 by use of the roll stamper, and evaluated in the same manner as in Example 11.

The results of Example 12 as described above are shown in Table 8.

The predetermined preformat size of the optical discs in Example 1 to 12 was made A=B=89.00 mm. That is B/A=1.

TABLE 8

|  | Size of preformat pattern of stamper | | Size of Preformat on resin sheet | | Deviated amount from true sphere | Amplitude quantity of tracking error signal |
| --- | --- | --- | --- | --- | --- | --- |
| Example 12 | a | 89.220 | a' | 88.689 | 1 μm | ⊚ |
|  | b | 89.340 | b' | 88.690 |  |  |

Example 13

A flexible stamper having 9 preformat patterns for an optical card as shown FIG. 7B was prepared.

Figure 17:
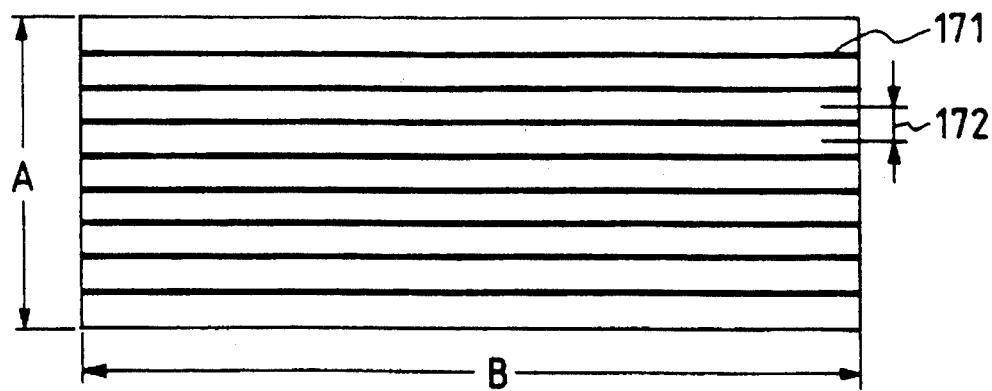
FIG. 17 is a view for explanation of a predetermined size of the preformat formed on an optical card substrate.

So that a stripe-shaped groove with a width of 3 μm and a pitch of 12 μm was formed in parallel to the widthwise direction on the substrate sheet for optical card within the region as a predetermined preformat of optical card with its length A of 30.990 mm and width B of 85.590 mm, as shown in FIG. 17, and also 2583 track groove patterns were formed within the region of the preformat pattern of the stamper with a length a of 31.021 mm and a width b of 85.847 mm in parallel to the width direction.

The stamper was prepared as shown in FIG. 10A–D by spinner coating a photoresist (trade name: Az-1370; produced by Hoechst Japan) on a glass substrate of 340 mm×340 mm×10 mm (thickness) to a thickness of 3000 Å, followed by pre-baking under the conditions of 90° C., 30 minutes.

Next, by use of a laser exposure apparatus (trade name: Mirror Projector Mask Aligner·MPA-1500, produced by Canon), 9 preformat patterns corresponding to the above size were exposed and developed by developer Az 312MIF (produced by Hoechst Japan) to prepare a glass master 101 having preformat patterns for optical card (step A).

Figure 10A:
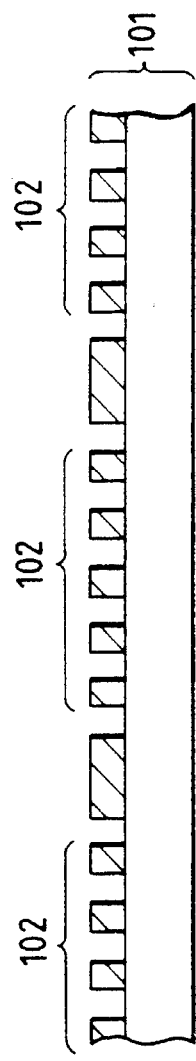
FIGS. 10A to 10D are diagrams of the steps of a preparation method of the flexible stamper shown in FIG. 7.
Figure 10B:
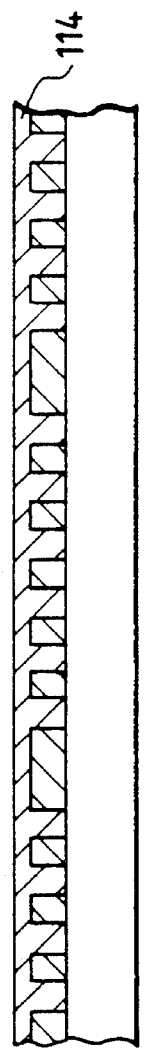

Further, as shown in FIG. 10B, an electroconducting film 114 was formed on the glass master by effecting the electroconducting treatment by use of a sputtering device as the pre-treatment for forming the metal film according to the electroplating method to form a nickel film with a film thickness of 1000 Å to 2000 Å.

Figure 10C:
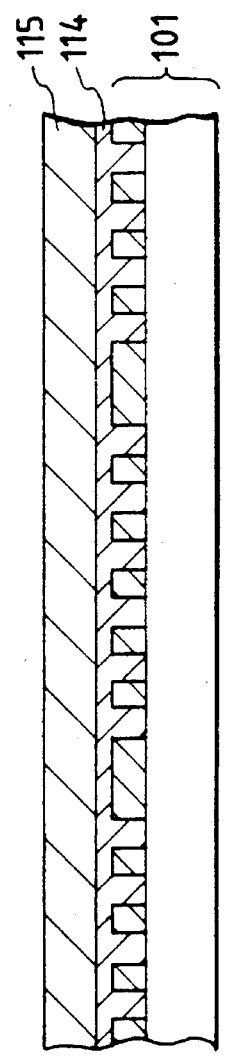

Next, as shown in FIG. 10C, a nickel film 115 with a thickness of 100 to 200 μm was formed according to the electroforming method.

The electroforming solution used here had a composition as shown below:

Nickel sulfamate.tetrahydrate [Ni $(NH_2SO_3)_24H_2O$]500 g/liter

Boric acid [$H_3BO_3$]35–38 g/liter

Pit preventive 2.5 ml/liter.

Figure 10D:
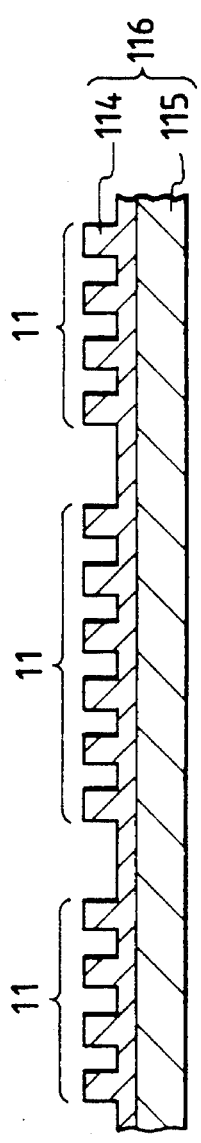
Figure 11A:
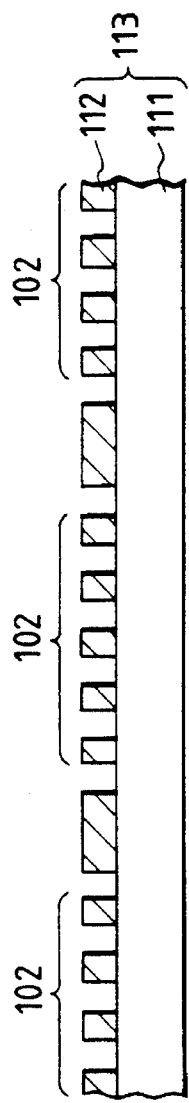
Figure 11B:
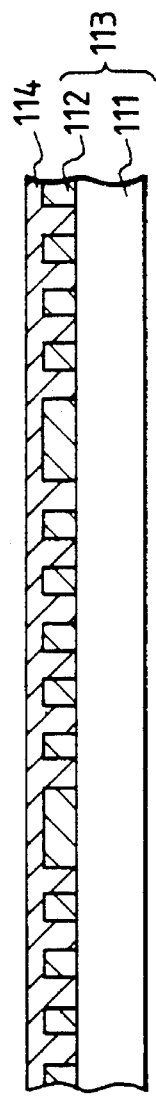
Figure 11C:
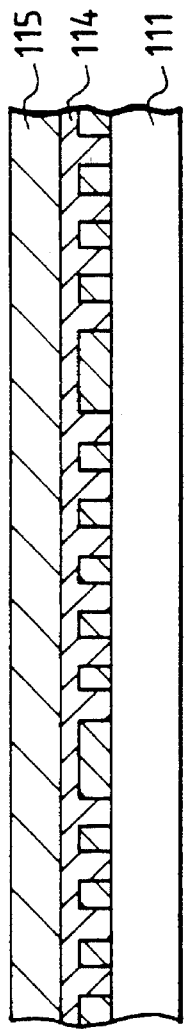
Figure 11D:
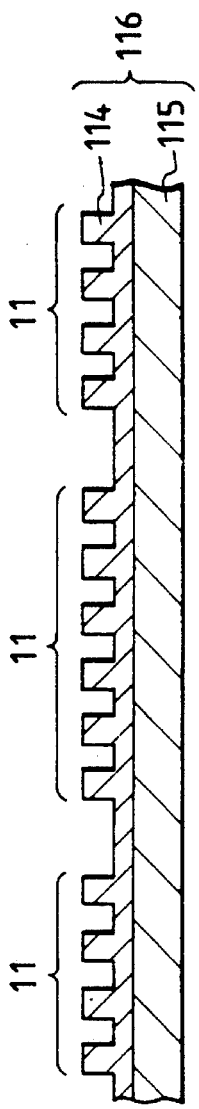

Finally as shown in FIG. 10D, the electroconducting film and the metal film in one body are peeled at the same time from the glass master, and the photoresist attached on the surface was removed to obtain a flexible stamper with a size of 300 mm×300 mm as shown in FIG. 7B having formed unevenness corresponding to the spiral-shaped guide grooves with line-and-space: 9.5 µm/2.5 µm, stepped difference: 2500 Å to 3000 Å.

Three sheets of the flexible stamper thus obtained were screwed at the both ends of the stamper 116 from above the fixing implements 153 as shown in FIG. 15B, and fixed on the roll substrate with a diameter of 300 mm so that the length (a) direction of the preformat pattern coincide with the peripheral direction of the roll substrate to prepare a roll stamper.

Next, by use of the roll stamper, an apparatus for preparing a substrate sheet for optical disc shown in FIG. 4 was prepared.

As shown in FIG. 4, a substrate sheet for optical recording medium was prepared by use of an extrusion molding machine using a coat hanger type T-die with a 20 cm width set downwardly at the extruder 1 with a screw diameter of 35 min.

As the resin, a polycarbonate resin (trade name: Panlite L-1250; produced by Teijin Kasei) was employed. The pressure molding portion 49 has mirror surface rolls for the rolls 41, 43, and the roll stamper previously prepared for the roll 42.

A molten resin sheet was formed under the extrusion conditions of the resin sheet, namely at the barrel temperatures of the extruder 45 at the a portion (Ta) of 300° C., at the b portion (Tb)=300° C., the c portion (Tc)=320° C., and the temperature of the T-die 46 of Td=320° C. The resin temperature at this time was 280° C. to 320° C.

The roll stamper 42 was maintained at 140° C., and the roll 41 was maintained at a temperature 1° to 2° C. lower than that of the roll 42, and the roll 43 at a temperature 20° to 21° C. higher than that of the roll 42.

The gap between the lip of the T-die and the pressure molding portion was made 50 mm, and the atmosphere from extrusion of the resin sheet to the pressure molding portion was controlled by enclosing it therearound with a heating box so that it became 60° C. or higher. The lip opening of the T-die was made 0.48 mm and the gap between the rolls 41, 42 at the pressure molding port, on 0.4 mm, under which conditions the preformat patterns of the roll stamper 42 were transferred onto the resin sheet to prepare a substrate sheet for an optical disc with a thickness of 0.4 mm.

The resin sheet was molded at a speed of 2 m/min. For the preformat on the substrate sheet for the information recording medium thus formed, when the length in the direction parallel to the conveying direction of the resin sheet of said preformat is made a' and the length in the direction vertical thereto b', the a' and b' were measured, and the deviation of a' and b' from A and B, which are the predetermined dimension of the preformat pattern, taken as a standard is determined.

Example 14

A flexible stamper as shown in FIG. 7B was prepared according to the method shown in FIG. 12.

First, a stamper made of nickel with a diameter of 86 mm (thickness 300 µm) having stripe-shaped guide grooves with a line-and-space: 9.5 µm/ 2.5 µm, stepped difference: 2500 Å–3000 Å formed on a sheet of a polyester (Lumilar, produced by Toray) with a thickness of 10 µm, a length of 1000 mm and a width of 300 mm was backed with a chromium steel with a thickness of 2 mm, sandwiched between similar chromium steels, anal heated and pressurized by application of a pressure of a pressure of 10 kg/cm² at 200° C. for 2 minutes, to transfer the preformat pattern, thereby preparing a base film master.

Next, as shown in the same FIG. 12B, the electroconducting film 114 was formed in the same manner as in Example 11, and then the metal film 115 was formed.

Next, the base film master in this state was wound up in a roll, and a nickel film was formed to a thickness of 220 µm on the electroconducting film by use of the electroforming apparatus shown in FIG. 13. The delivery speed of the base film at this time was made 40 m/min., and the electrolytic condition 250 AH.

Subsequently, the electroconducting film and the metal film were peeled from the base film master to obtain a flexible pattern in a continuous length shown in FIG. 18. The stamper was cut in conformity with a roll with a diameter of 300 mm to form a flexible stamper having 6 preformat patterns with strip-shaped track grooves having a length a=31.036 mm, a width b=85.932 mm, a line-and-space of 9.5 µm/2.5 µm and a groove depth of 2500 Å to 3000 Å.

Next, the stamper was fixed by screwing of both ends thereof from above the stamper fixing implement 3 as shown FIG. 15C so that the length (a) direction of the preformat pattern was consistent with the peripheral direction of the roll substrate to prepare a roll stamper.

By use of the roll stamper, a substrate sheet for optical card was prepared in the same manner as in Example 13 and evaluated.

Example 15

A flexible stamper for optical card as shown in FIG. 7B was prepared according to the electroforming method.

Figure 16A:
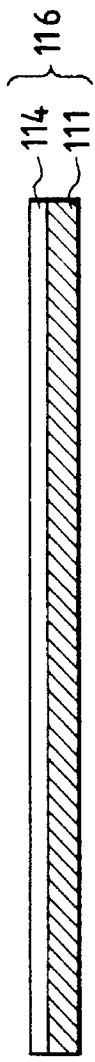
FIGS. 16A to 16D are diagrams of the steps of still another preparation method of the flexible stamper shown in FIG. 7.

First, as shown in FIG. 16A, an electro-conducting film 114 was formed on a polyester base film 111 by sputtering as the pre-treatment for formation of a metal film 115 according to the electroforming method.

Here, by forming a nickel film with a film thickness of 1000 to 2000 Å, the electroconducting film 114 was formed on the base film 111.

Figure 16B:
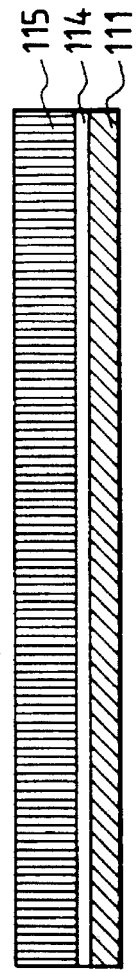
Figure 16C:
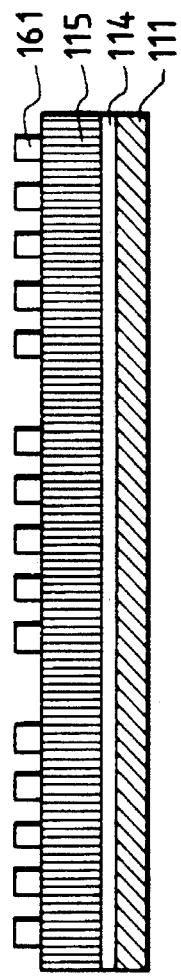
Figure 16D:
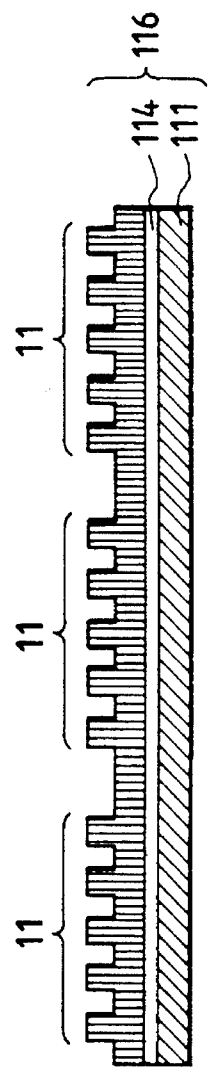

Next, as shown in the same FIG. 16B, the metal film 115 was formed on the electroconducting film according to the electroforming method.

First, as shown in FIG. 13, the nickel chip 132 within the electroforming tank was set on the+ side electrode and the base film provided with the electroconducting film on the– side, and the base film was continuously delivered into the electroforming solution.

While moving the base film provided with the electroconducting film 9 in a nickel sulfamate solution in the arrowhead direction in FIG. 2, nickel metal of 100 to 200 µm was deposited under the conditions of time integrated values 17 to 34 AH (apere·hour) of the passed current to form a metal film 115.

The electroforming solution used here had the following composition:

Nickel sulfamate.tetrahydrate [Ni(NH$_2$SO$_3$)$_2$.4H$_2$O] 500 g/liter

Boric acid [H$_3$BO$_3$] 35–38 g/liter

Pit preventive 2.5 ml/liter.

Next, after the surface of the metal film 115 was polished, a photoresist was coated thereon, followed by exposure and developing to form a resist pattern.

The polishing method may be carried out according to the 2 steps of dry polishing and wet polishing, and in dry polishing, polishing was carried out by use of MC diamond disc #230 (trade name) for the polishing cloth for 8 hours, while in wet polishing, polishing was carried out by use of Suede 7355-000F42S (trade name) for the polishing cloth and POLIPLA700 (trade name) for the polishing agent for 16 hours. The extent of polishing was made within±3 Newton rings for the surface precision, and 50 to 100 angstroms or less for the surface roughness.

Here, as the photoresist, Az1370 (produced by Hoechst-Japan) was employed and this was coated on the polished metal film 13 to a film thickness of 3000 Å by a roll coater. Then, pre-baking was carried out under the conditions of 90° C., 30 min. Next, by means of a laser exposure apparatus, Mirror Projector Mask Aligner-MPA-1500 (produced by Canon), the preformat pattern (stripe shape) was exposed and developed by a developer Az312MIF (produced by Hoechst-Japan), followed by post-baking to form a resist pattern.

Finally, the metal film 115 was subjected to wet etching. The wet etching was carried out by effecting etching with a solution of hydrofluoric acid and ammonia fluoride Nt4F (1:7 weight ratio) for about 1 minute, while rotating the metal film (electroformed film +electroconducting film +film) around its own axis.

After etching, $O_2$ plasma etching was applied by use of $O_2$, and the residual resist was removed, whereby a fine pattern corresponding to the patterning-pattern was formed on the metal film.

Figure 18:
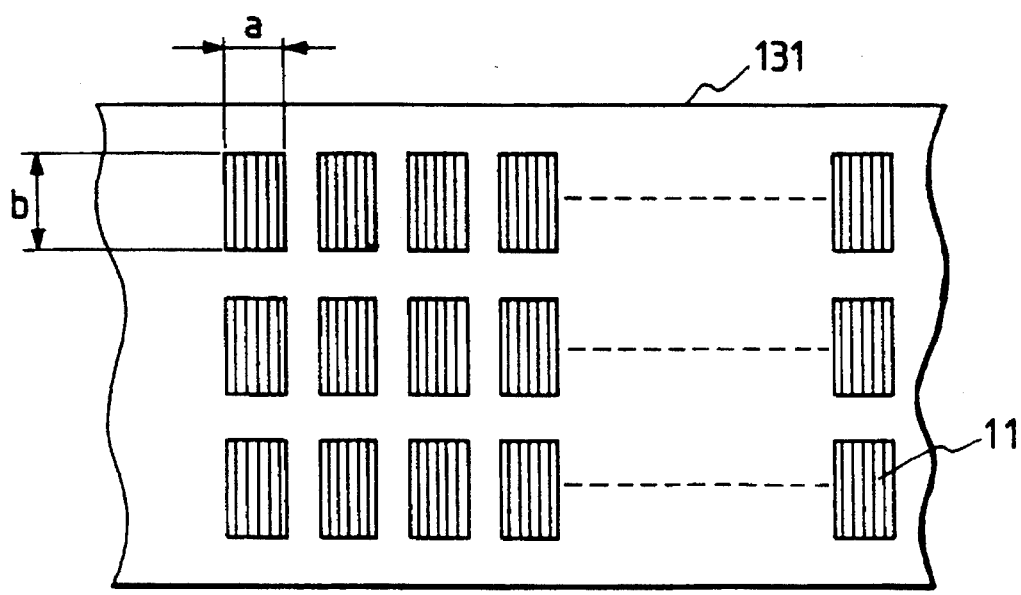
FIG. 18 is a schematic illustration of the flexible stamper in a continuous length of the present invention.

Thus, a flexible stamper in a continuous length shown in FIG. 18 having a stripe-shaped preformat pattern with a=31.005 mm, b=85.676 mm and a line-and-space: 9.5 μm/2.5 μm, stepped difference: 2500–3000 Å, was obtained. Subsequently, the stamper was cut in conformity with a roll substrate with a diameter of 300 mm, fixed in the same manner as in Example 14 so that the length $\underline{a}$ direction may be consistent with the peripheral direction of the roll stamper, and molding of the substrate sheet for optical card was carried out.

For Examples 13 to 15 as described above, dimensional deviations of the respective values a' and b' from A, B were measured to obtain the results shown in Table 9.

Reference examples 1, 2

As references examples, in the same manner is in Example 13 except for changing the dimensions a, b of the preformat pattern to the sizes shown in Table 9, the preformat pattern was transferred. The results are shown in Table 9.

TABLE 9

| | Size of preformat pattern of stamper | | Size of preformat on resin sheet | | Deviated amount from the predetermined preformat size (A × B) |
|---|---|---|---|---|---|
| Example 13 | | | | | |
| $\frac{a-A}{A} = 0.1$ | a | 31.021 mm | a' | 30.989 mm | 1 μm |
| $\frac{b-B}{B} = 0.3$ | b | 85.847 mm | b' | 85.592 mm | 2 μm |
| Example 14 | | | | | |
| (0.15) | a | 31.036 | a' | 31.005 | 15 μm |
| (0.4) Example 15 | b | 85.932 | b' | 85.676 | 86 μm |
| (0.05) Reference example 1 | a | 31.005 | a' | 30.975 | 15 μm |
| (0.1) | b | 85.676 | b' | 85.419 | 171 μm |
| (0.01) Reference example 2 | a | 30.993 | a' | 30.962 | 28 μm |
| (0.05) | b | 85.632 | b' | 85.376 | 214 μm |
| (0.3) | a | 31.082 | a' | 31.052 | 62 μm |
| (0.7) | b | 86.189 | b' | 85.932 | 342 μm |

We claim:

1. A process for producing a substrate sheet for an information recording medium, having a preformat pattern with a length A and a width B, which comprise the steps of:

melt-extruding a resin sheet; and passing the extruded resin sheet between a roll stamper, having on its periphery a pattern to be transferred corresponding to the preformat pattern, and a roll disposed opposite to the roll stamper, to transfer the pattern to be transferred to the extruded resin sheet, wherein the pattern to be transferred has a length a corresponding to the length A in the rotational direction of the roll stamper and a width b corresponding to the width B in a direction parallel to the axis of the roll stamper, the value of b/a being larger than the value of B/A.

2. A process according to claim 1, wherein the roll stamper is comprised of a roll substrate and a flexible stamper having on its surface the pattern to be transferred, which is provided on the periphery of the roll substrate.

3. A process according to claim 1, wherein the roll stamper has a plurality of patterns to be transferred which are formed in its which are formed on its periphery.

4. A process according to claim 1, wherein the substrate sheet is used as a substrate sheet for an optical card.

5. A process according to claim 1, wherein the length A and width B of the preformat pattern and the length a and width b of the pattern to be transferred satisfy the following conditions:

$0.05 \leq 100(a-A)/A \leq 0.15$ $0.1 \leq 100(b-B)/B \leq 0.5$.

6. A process according to claim 5, wherein the width B of the preformat pattern and the width b of the pattern to be transferred satisfy the following conditions:

$0.2 \leq 100(b-B)/B \leq 0.4$.

\* \* \* \* \*

UNITED STATES PATENT AND TRADEMARK OFFICE
CERTIFICATE OF CORRECTION

PATENT NO. : 5,516,469
DATED : May 14, 1996
INVENTOR(S) : TSUYOSHI SANTOH, ET AL.

It is certified that error appears in the above-indentified patent and that said Letters Patent is hereby corrected as shown below:

COLUMN 1:

Line 6, "08/083,056," should read --08/038,056,--.
Line 61, "similarly" (both occurrences) should be deleted.

Column 2

Line 41, "of;" should read --of:--.
Line 45, "layer;" should read --layer,--.

Column 3

Line 15, "of-the" should read --of the--.

Column 4

Line 64, "lid" should read --11D--.

Column 6

Line 53, "manner" should read --manner:--.

UNITED STATES PATENT AND TRADEMARK OFFICE
CERTIFICATE OF CORRECTION

PATENT NO. : 5,516,469
DATED : May 14, 1996
INVENTOR(S) : TSUYOSHI SANTOH, ET AL.

It is certified that error appears in the above-indentified patent and that said Letters Patent is hereby corrected as shown below:

Column 7

Line 27, "turn table" should read --turntable--.
Line 43, "turn table" should read --turntable--.
Line 62, "revolution" should read --revolutions--.
Line 63, "turn table" should read --turntable--.

Column 8

Line 37, "turntable 52" should read --turntable 57--.
Line 65, "distance" should read --distance $\ell$--.

Column 10

Line 7, "the+" should read --the +--, and "the-side" should read --the - side--.

Column 11

Line 18, close up right margin.
Line 19, close up left margin.
Line 27, "$o_2$" should read --$O_2$--.
Line 29, "film" should read --film.--.

UNITED STATES PATENT AND TRADEMARK OFFICE
CERTIFICATE OF CORRECTION

PATENT NO. : 5,516,469
DATED : May 14, 1996
INVENTOR(S) : TSUYOSHI SANTOH, ET AL.

It is certified that error appears in the above-indentified patent and that said Letters Patent is hereby corrected as shown below:

Column 12

Line 1, "where" should read --of--.
    Line 2, "sheet" should read --sheet for--.
    Line 8, "a error" should read --a tracking error--.
    Line 11, "show" should read --shown--.
    Line 19, "for" should read --for an--.
    Line 42, "mediums" should read --media--.

Column 14

Line 1, "enable" should read --enables--.
    Line 28, "0.0039x$\ell$(m/n)" should read --0.0039x$\ell$(mm)--.
    Line 49, "an" should read --a--. (second occurance)
    Line 61, "20°C" should read --320°C--.

Column 18

Line 10, "part/a" should read --part a--.
    Line 67, "plate," should read --plate.--.

Column 19

Line 6, "part,a" should read --part a--.
    Line 66, "[$H_3BO_3$]35-38 g/liter" should read --[$H_3BO_3$] 35-38 g/liter--.

UNITED STATES PATENT AND TRADEMARK OFFICE
CERTIFICATE OF CORRECTION

PATENT NO. : 5,516,469     Page 4 of 6
DATED : May 14, 1996
INVENTOR(S) : TSUYOSHI SANTOH, ET AL.

It is certified that error appears in the above-indentified patent and that said Letters Patent is hereby corrected as shown below:

Column 20

Line 43, close up right margin.
    Line 44, close up left margin.
    Line 49, close up right margin.
    Line 50, close up left margin.
    Line 60, "hiqher" should read --higher--.
    Line 61, "nap" should read --gap--.

Column 21

Line 8, "Table -7." should read --Table - 7.--.
    Line 18, "measurement:" should read --measurement--.
    Line 25, "by ," should read --by $\bigcirc$,--.
    Line 35, "HoechstJapan)" should read --Hoechst - Japan)--.
    Line 49, [Ni (NH$_2$SO$_3$)$_2$.4H$_2$O]500" should read
             --[Ni (NH$_2$SO$_3$)$_2$.4H$_2$O] 500--.
    Line 51, "[H$_3$BO$_3$]35-38 g/liter" should read
             --[H$_3$BO$_3$] 35-38 g/liter--.
    Line 53, "2-5ml/titer" should read --2.5 ml/liter--.

UNITED STATES PATENT AND TRADEMARK OFFICE
CERTIFICATE OF CORRECTION

PATENT NO. : 5,516,469  Page 5 of 6
DATED : May 14, 1996
INVENTOR(S) : TSUYOSHI SANTOH, ET AL.

It is certified that error appears in the above-indentified patent and that said Letters Patent is hereby corrected as shown below:

Column 22

Line 26, "for" should read --for an--.
Line 31, "85,847 mm" should read --85.847 mm--.
Line 57, "[Ni (NH$_2$SO$_3$)$_2$4H$_2$O]500" should read
     --[Ni (NH$_2$SO$_3$)$_2$ . 4 H$_2$O] 500--.
Line 60, "[H$_3$BO$_3$]35-38 g/liter" should read
     --[H$_3$BO$_3$] 35-38 g/liter--.

Column 23

Line 39, "port, on" should read --portion--.

Column 24

Line 8, "40 m/min.," should read --40 mm/min.,--.
Line 44, "the+" should read --the +--.
Line 45, "the-" should read --the - --.
Line 52, "(apere. hour)" should read --ampere.hour)--.
Line 56, "[Ni(NH$_2$SO$_3$)$_2$.4H$_2$O]500" should read
     --[Ni(NH$_2$SO$_3$)$_2$.4H$_2$O] 500--.
Line 58, "[H$_3$BO$_3$]35-38 g/liter" should read
     --[H$_3$BO$_3$] 35-38 g/liter--.

UNITED STATES PATENT AND TRADEMARK OFFICE
CERTIFICATE OF CORRECTION

PATENT NO. : 5,516,469
DATED : May 14, 1996
INVENTOR(S) : TSUYOSHI SANTOH, ET AL.

It is certified that error appears in the above-indentified patent and that said Letters Patent is hereby corrected as shown below:

Column 25

Line 4, "within±3" should read --within ± 3--.
Line 19, "Nt4F" should read --NH4F--.
Line 21, "+electroconducting" should read
           --+ electroconducting--.
Line 22, "+film" should read --+ film--.
Line 42, "is" should read --as--.

Column 26

Line 25, "comprise" should read --comprises--.
Line 45, delete "which".
Line 46, delete "are formed in its".

Signed and Sealed this

Nineteenth Day of November, 1996

Attest:

BRUCE LEHMAN

Attesting Officer     Commissioner of Patents and Trademarks